(12) United States Patent
Ignomirello et al.

(10) Patent No.: US 10,789,137 B2
(45) Date of Patent: *Sep. 29, 2020

(54) FAST SYSTEM STATE CLONING

(71) Applicant: Formulus Black Corporation, Jersey City, NJ (US)

(72) Inventors: Brian M. Ignomirello, Colts Neck, NJ (US); Suihong Liang, Holmdel, NJ (US)

(73) Assignee: Formulus Black Corporation, Jersey City, NJ (US)

( * ) Notice: Subject to any disclaimer, the term of this patent is extended or adjusted under 35 U.S.C. 154(b) by 305 days.

This patent is subject to a terminal disclaimer.

(21) Appl. No.: 15/957,591

(22) Filed: Apr. 19, 2018

(65) Prior Publication Data

US 2018/0267865 A1    Sep. 20, 2018

Related U.S. Application Data

(63) Continuation of application No. 15/728,347, filed on Oct. 9, 2017, now Pat. No. 9,977,719, which is a (Continued)

(51) Int. Cl.
*G06F 11/14* (2006.01)
*G06F 21/62* (2013.01)

(52) U.S. Cl.
CPC ...... *G06F 11/1469* (2013.01); *G06F 11/1451* (2013.01); *G06F 11/1464* (2013.01); (Continued)

(58) Field of Classification Search
CPC ............. G06F 11/1469; G06F 11/1451; G06F 11/1464; G06F 21/62; G06F 2201/805; G06F 2201/84

See application file for complete search history.

(56) References Cited

U.S. PATENT DOCUMENTS 3,016,527 A    1/1962 Gilbert et al.
3,739,410 A    6/1973 Fortin
(Continued)

FOREIGN PATENT DOCUMENTS

CA    2327998 A1    6/2001
CA    2638672 A1    2/2009
(Continued)

OTHER PUBLICATIONS

"CleanSync 2.0", CleanSync Team, retrieved from http://www.top4download.com/cleansync/xfliyozl.html, dated Feb. 25, 2012, 3 pages.
(Continued)

*Primary Examiner* — Alford W Kindred
*Assistant Examiner* — Tiffany Thuy Bui
(74) *Attorney, Agent, or Firm* — Knobbe Martens Olson & Bear LLP

(57) ABSTRACT

A system and method to create a clone of a source computing system, the system including the steps of selecting a memory space coupled to the source computing system, retrieving uncoded data from the selected memory space, encoding the uncoded data by use of a bit-marker-based encoding process executing on a backup server, storing encoded data in a protected memory coupled to the backup server, wherein the protected memory is protected from a power interruption, retrieving the encoded data from the protected memory; and decoding, the encoded data onto a target computing system, wherein the target computing system is separate from the source computing system.

20 Claims, 6 Drawing Sheets

Related U.S. Application Data continuation of application No. 15/089,837, filed on Apr. 4, 2016, now Pat. No. 9,817,728, and a continuation-in-part of application No. 14/804,175, filed on Jul. 20, 2015, now Pat. No. 9,304,703, and a continuation-in-part of application No. 13/908,239, filed on Jun. 3, 2013, now Pat. No. 9,467,294, which is a continuation-in-part of application No. 13/797,093, filed on Mar. 12, 2013, now Pat. No. 10,133,636, and a continuation-in-part of application No. 13/756,921, filed on Feb. 1, 2013, now abandoned.

(60) Provisional application No. 62/202,983, filed on Aug. 10, 2015, provisional application No. 62/148,160, filed on Apr. 15, 2015.

(52) U.S. Cl.
CPC ........ *G06F 21/62* (2013.01); *G06F 2201/805* (2013.01); *G06F 2201/84* (2013.01)

(56) References Cited

U.S. PATENT DOCUMENTS

| | | | |
|---|---|---|---|
| 3,926,346 | A | 12/1975 | Dub et al. |
| 4,183,464 | A | 1/1980 | Babb |
| 4,286,256 | A | 8/1981 | Langdon, Jr. et al. |
| D264,844 | S | 6/1982 | Tuck |
| 4,374,382 | A * | 2/1983 | Markowitz .......... A61B 5/0031 340/870.01 |
| 4,420,767 | A | 12/1983 | Hodge et al. |
| 4,560,977 | A | 12/1985 | Murakami et al. |
| 4,625,710 | A | 12/1986 | Harada et al. |
| 4,635,141 | A | 1/1987 | Coulter |
| D304,193 | S | 10/1989 | Lotz |
| D308,671 | S | 6/1990 | Aderman et al. |
| 4,931,340 | A | 6/1990 | Baba et al. |
| D319,765 | S | 9/1991 | McCord |
| 5,168,171 | A | 12/1992 | Tracewell |
| D341,866 | S | 11/1993 | Ross |
| 5,300,930 | A | 4/1994 | Burger et al. |
| D353,182 | S | 12/1994 | Rubin |
| D357,461 | S | 4/1995 | Zaplatynsky et al. |
| 5,424,994 | A * | 6/1995 | Nagasawa ................. G06F 1/30 365/226 |
| D362,243 | S | 9/1995 | Spechts et al. |
| D366,246 | S | 1/1996 | Simek et al. |
| D372,909 | S | 8/1996 | Naufel |
| D377,482 | S | 1/1997 | Geck |
| D382,880 | S | 8/1997 | Cienkus et al. |
| D391,938 | S | 3/1998 | D'Agaro |
| D393,455 | S | 4/1998 | D'Agaro et al. |
| 5,748,921 | A | 5/1998 | Lambrecht et al. |
| 5,751,549 | A | 5/1998 | Eberhardt et al. |
| 5,784,611 | A | 7/1998 | Thantrakul |
| 5,785,799 | A | 7/1998 | Culnane et al. |
| D396,690 | S | 8/1998 | Fryers |
| D397,097 | S | 8/1998 | McNally |
| 5,797,143 | A | 8/1998 | Buxton |
| 5,818,877 | A | 10/1998 | Tsai et al. |
| 5,867,180 | A | 2/1999 | Katayama et al. |
| 5,872,530 | A | 2/1999 | Domyo et al. |
| D407,079 | S | 3/1999 | Wu |
| 5,878,240 | A | 3/1999 | Tomko |
| 5,890,794 | A | 4/1999 | Abtahi et al. |
| D409,171 | S | 5/1999 | Wu |
| 5,923,860 | A | 7/1999 | Olarig |
| D415,747 | S | 10/1999 | Wu |
| D421,428 | S | 3/2000 | Wu |
| D422,993 | S | 4/2000 | Storti et al. |
| D423,479 | S | 4/2000 | Alo et al. |
| 6,052,785 | A | 4/2000 | Lin et al. |
| 6,067,227 | A | 5/2000 | Katsui et al. |
| D431,241 | S | 9/2000 | Armstrong et al. |
| 6,182,601 | B1 | 2/2001 | Baatz |
| D439,566 | S | 3/2001 | Ohanian |
| 6,243,831 | B1 | 6/2001 | Mustafa et al. |
| 6,275,173 | B1 | 8/2001 | Wu |
| D447,484 | S | 9/2001 | Reznikov et al. |
| 6,297,742 | B1 | 10/2001 | Canada et al. |
| 6,297,753 | B1 | 10/2001 | Hayami |
| 6,310,564 | B1 | 10/2001 | Fujimoto |
| 6,326,781 | B1 | 12/2001 | Kunde et al. |
| 6,373,695 | B1 | 4/2002 | Cheng |
| 6,396,027 | B1 | 5/2002 | Wu |
| 6,401,807 | B1 | 6/2002 | Wyler et al. |
| D462,075 | S | 8/2002 | Hillyard et al. |
| 6,430,351 | B1 | 8/2002 | Takahashi et al. |
| 6,442,031 | B1 | 8/2002 | Liu |
| 6,465,969 | B1 | 10/2002 | Murasko et al. |
| 6,483,439 | B1 | 11/2002 | Vukosic |
| 6,494,780 | B1 | 12/2002 | Norbury, Jr. |
| D471,912 | S | 3/2003 | Camarota et al. |
| 6,541,921 | B1 | 4/2003 | Luciano, Jr. et al. |
| D475,061 | S | 5/2003 | Huang |
| 6,560,599 | B1 | 5/2003 | Boa et al. |
| 6,605,778 | B2 | 8/2003 | Dorfler et al. |
| 6,614,369 | B1 | 9/2003 | Widmer |
| 6,621,935 | B1 | 9/2003 | Xin et al. |
| 6,626,557 | B1 | 9/2003 | Taylor |
| 6,644,481 | B2 | 11/2003 | Dean et al. |
| D483,374 | S | 12/2003 | Hung |
| D483,378 | S | 12/2003 | Mundt |
| 6,658,435 | B1 | 12/2003 | McCall |
| 6,674,908 | B1 | 1/2004 | Aronov |
| 6,683,545 | B2 | 1/2004 | Strasser |
| D490,083 | S | 5/2004 | Wu |
| 6,737,299 | B1 | 5/2004 | Jiang |
| 6,785,133 | B2 | 8/2004 | Barringer et al. |
| 6,785,815 | B1 | 8/2004 | Serret-Avila et al. |
| 6,829,695 | B1 | 12/2004 | Ross |
| 6,844,824 | B2 | 1/2005 | Vukosic |
| D503,717 | S | 4/2005 | Kawamura |
| 6,904,484 | B1 | 6/2005 | Nelson |
| 6,905,228 | B1 | 6/2005 | Takeyasu et al. |
| 6,926,972 | B2 | 8/2005 | Jakobi et al. |
| 6,956,745 | B2 | 10/2005 | Kerrigan et al. |
| D513,751 | S | 1/2006 | Alo et al. |
| 6,999,319 | B2 | 2/2006 | Wu et al. |
| 7,030,837 | B1 | 4/2006 | Vong et al. |
| 7,064,265 | B2 | 6/2006 | Cochrane |
| 7,111,961 | B2 | 9/2006 | Trenchard et al. |
| D529,915 | S | 10/2006 | Scicluna et al. |
| D530,052 | S | 10/2006 | Berti |
| D530,343 | S | 10/2006 | Maruyama et al. |
| D530,704 | S | 10/2006 | Cortes |
| 7,145,776 | B2 | 12/2006 | King, Jr. et al. |
| D535,298 | S | 1/2007 | Cochrane |
| 7,164,581 | B2 | 1/2007 | Carullo |
| 7,174,436 | B1 | 2/2007 | Langendorf et al. |
| 7,231,560 | B2 | 6/2007 | Lai et al. |
| 7,246,037 | B2 | 7/2007 | Evans |
| 7,290,116 | B1 | 10/2007 | Grohoski et al. |
| D555,159 | S | 11/2007 | Cox et al. |
| D556,204 | S | 11/2007 | Tosh et al. |
| 7,298,535 | B2 | 11/2007 | Kuutti |
| D565,573 | S | 4/2008 | Alo |
| 7,356,679 | B1 | 4/2008 | Le et al. |
| 7,357,530 | B2 | 4/2008 | Wang et al. |
| 7,363,331 | B2 | 4/2008 | Karasudani et al. |
| D570,851 | S | 6/2008 | Gundogan et al. |
| 7,371,975 | B2 | 6/2008 | Oettinger et al. |
| D579,455 | S | 10/2008 | Chu |
| 7,463,163 | B2 | 12/2008 | Wu |
| 7,485,510 | B2 | 2/2009 | Zhu et al. |
| 7,492,607 | B2 | 2/2009 | Nguyen et al. |
| D590,831 | S | 4/2009 | Evans |
| 7,515,413 | B1 | 4/2009 | Curtis |
| 7,516,272 | B2 | 4/2009 | Felton et al. |
| 7,539,026 | B2 | 5/2009 | Finnerty et al. |
| D593,565 | S | 6/2009 | Dearborn et al. |
| 7,587,408 | B2 | 9/2009 | Snapp et al. |
| 7,620,784 | B2 | 11/2009 | Panabaker |

(56) References Cited

U.S. PATENT DOCUMENTS

| | | |
|---|---|---|
| D609,236 S | 2/2010 | Matsumoto et al. |
| 7,726,837 B2 | 6/2010 | Ewert |
| 7,731,180 B2 | 6/2010 | Ohnishi |
| D619,108 S | 7/2010 | Lin |
| 7,794,124 B2 | 9/2010 | Hulsey et al. |
| 7,822,946 B2 | 10/2010 | Sharma |
| D631,480 S | 1/2011 | Vaughan |
| D631,630 S | 1/2011 | Berti |
| 7,921,088 B1 | 4/2011 | Mittal |
| 7,925,389 B2 | 4/2011 | Bradicich et al. |
| 7,930,473 B2 | 4/2011 | Rajan |
| D643,434 S | 8/2011 | Grady, IV et al. |
| 7,991,941 B2 | 8/2011 | Fortin |
| 7,996,361 B1 | 8/2011 | Shah et al. |
| 8,001,079 B2 | 8/2011 | Lu et al. |
| 8,006,108 B2 | 8/2011 | Brey et al. |
| 8,009,069 B2 | 8/2011 | Chen et al. |
| D646,954 S | 10/2011 | Azelton et al. |
| 8,078,789 B2 | 12/2011 | Hinrichs |
| 8,117,028 B2 | 2/2012 | Murashima |
| D656,250 S | 3/2012 | Forster et al. |
| D656,502 S | 3/2012 | Cacioppo et al. |
| 8,129,742 B2 | 3/2012 | Lin et al. |
| 8,139,945 B1 | 3/2012 | Amir et al. |
| 8,164,490 B2 | 4/2012 | Itani |
| D659,136 S | 5/2012 | Matsumoto |
| D659,137 S | 5/2012 | Matsumoto |
| D659,653 S | 5/2012 | Lin |
| D661,696 S | 6/2012 | Takada |
| D662,501 S | 6/2012 | Lohman |
| D662,504 S | 6/2012 | Lohman |
| 8,200,923 B1 | 6/2012 | Healey et al. |
| D663,299 S | 7/2012 | Corke et al. |
| 8,214,425 B2 | 7/2012 | Provencal |
| 8,229,898 B1 | 7/2012 | Pype |
| 8,237,594 B2 | 8/2012 | Suzuki et al. |
| 8,238,091 B2 | 8/2012 | Chang et al. |
| 8,238,840 B2 | 8/2012 | Lio et al. |
| 8,265,323 B2 | 9/2012 | Stiehl et al. |
| 8,281,013 B2 | 10/2012 | Mundkur et al. |
| 8,290,160 B1 | 10/2012 | Steeger |
| 8,310,830 B2 | 11/2012 | Zheng et al. |
| 8,314,555 B2 | 11/2012 | Huang et al. |
| 8,322,040 B2 | 12/2012 | Jimenez |
| 8,334,838 B2 | 12/2012 | Sadahiro et al. |
| D676,039 S | 2/2013 | Wallace et al. |
| D676,852 S | 2/2013 | Lohman |
| 8,366,464 B1 | 2/2013 | Figuerado et al. |
| D678,273 S | 3/2013 | Kuehn et al. |
| D681,635 S | 5/2013 | Wang |
| D682,267 S | 5/2013 | Mase |
| 8,458,696 B2 | 6/2013 | Park et al. |
| 8,470,388 B1 | 6/2013 | Zsinko et al. |
| D685,373 S | 7/2013 | Santos et al. |
| 8,474,994 B2 | 7/2013 | Campman |
| 8,508,928 B2 | 8/2013 | Killen et al. |
| 8,547,825 B2 | 10/2013 | Armstrong et al. |
| 8,560,501 B2 | 10/2013 | Deetz |
| 8,566,288 B1 | 10/2013 | Deetz |
| 8,570,738 B2 | 10/2013 | Fan et al. |
| D694,240 S | 11/2013 | Cho |
| 8,583,194 B2 | 11/2013 | Lio et al. |
| 8,589,643 B2 | 11/2013 | Meyer et al. |
| D694,758 S | 12/2013 | Muller |
| 8,601,201 B2 | 12/2013 | Scannell et al. |
| 8,639,849 B2 | 1/2014 | Achler |
| D699,212 S | 2/2014 | Tanaka |
| D702,650 S | 4/2014 | Reed et al. |
| 8,701,108 B2 | 4/2014 | Sekiguchi et al. |
| 8,704,771 B2 | 4/2014 | Shigeta |
| D705,836 S | 5/2014 | Huschka |
| 8,715,127 B2 | 5/2014 | Beutler et al. |
| 8,717,764 B2 | 5/2014 | Sun |
| D706,780 S | 6/2014 | Abdollahi et al. |
| 8,782,463 B1 | 7/2014 | Singh |
| 8,793,684 B2 | 7/2014 | Breitgand et al. |
| D711,382 S | 8/2014 | Eriksen |
| 8,806,480 B2 | 8/2014 | Araujo, Jr. et al. |
| 8,832,352 B2 | 9/2014 | Tsirkin et al. |
| 8,839,112 B2 | 9/2014 | Neerudu et al. |
| 8,847,797 B1 | 9/2014 | Barr |
| 8,856,255 B2 | 10/2014 | Ramakrishnan et al. |
| 8,868,860 B2 | 10/2014 | Beeken |
| 8,880,470 B2 | 11/2014 | Mashtizadeh et al. |
| D719,128 S | 12/2014 | Teulie |
| D719,571 S | 12/2014 | Sugiihara et al. |
| D720,353 S | 12/2014 | Nakamura |
| D720,357 S | 12/2014 | Kwon et al. |
| 8,904,383 B2 | 12/2014 | Bash et al. |
| 8,909,884 B2 | 12/2014 | Fleming et al. |
| 8,930,647 B1 | 1/2015 | Smith |
| 8,938,643 B1 | 1/2015 | Karmarkar et al. |
| D722,060 S | 2/2015 | Kwon et al. |
| D722,995 S | 2/2015 | Moreau |
| 8,954,645 B2 | 2/2015 | North et al. |
| 8,964,385 B2 | 2/2015 | Lam et al. |
| D723,554 S | 3/2015 | Choo et al. |
| D723,555 S | 3/2015 | Choo et al. |
| 8,988,821 B2 | 3/2015 | Li |
| D726,180 S | 4/2015 | Roat et al. |
| 9,003,144 B1 | 4/2015 | Hayes et al. |
| D729,242 S | 5/2015 | Kim et al. |
| D729,809 S | 5/2015 | Akana et al. |
| D730,307 S | 5/2015 | Tang et al. |
| 9,035,786 B2 | 5/2015 | Clifford et al. |
| D731,010 S | 6/2015 | Levitt et al. |
| D731,484 S | 6/2015 | Olsson et al. |
| D733,137 S | 6/2015 | Kawai |
| 9,053,068 B2 | 6/2015 | Tsirkin et al. |
| D734,754 S | 7/2015 | Ficacci |
| D735,726 S | 8/2015 | Chen |
| 9,106,020 B2 | 8/2015 | Cohen et al. |
| 9,141,625 B1 | 9/2015 | Thornewell et al. |
| D740,817 S | 10/2015 | Ignomirello |
| D740,818 S | 10/2015 | Ignomirello |
| D741,333 S | 10/2015 | Aoyagi et al. |
| 9,170,831 B2 | 10/2015 | Robinson et al. |
| D742,876 S | 11/2015 | Ignomirello |
| D742,883 S | 11/2015 | Akana et al. |
| D742,887 S | 11/2015 | Ignomirello |
| D743,404 S | 11/2015 | Ignomirello |
| 9,183,158 B2 | 11/2015 | O'Loughlin et al. |
| 9,195,401 B2 | 11/2015 | Li et al. |
| 9,195,491 B2 | 11/2015 | Zhang et al. |
| 9,201,674 B2 | 12/2015 | Rogel et al. |
| 9,280,380 B2 | 3/2016 | Tsirkin |
| 9,304,703 B1 | 4/2016 | Ignomirello |
| 9,317,326 B2 | 4/2016 | Ramanathan et al. |
| 9,336,042 B1 | 5/2016 | Brenneman et al. |
| 9,336,050 B2 | 5/2016 | Nakata et al. |
| 9,354,918 B2 | 5/2016 | Gupta et al. |
| 9,377,963 B2 | 6/2016 | Colbert et al. |
| 9,389,937 B2 | 7/2016 | Ackaret et al. |
| 9,438,534 B2 | 9/2016 | Xia et al. |
| D768,135 S | 10/2016 | Ignomirello |
| D768,136 S | 10/2016 | Ignomirello |
| 9,467,294 B2 | 10/2016 | Ignomirello |
| 9,552,217 B2 | 1/2017 | Tarasuk-Levin et al. |
| 9,558,005 B2 | 1/2017 | Sathyanarayana |
| 9,582,303 B2 | 2/2017 | Shu et al. |
| 9,582,319 B2 | 2/2017 | Ayala et al. |
| 9,584,312 B2 | 2/2017 | Ignomirello |
| 9,603,251 B1 | 3/2017 | Ignomirello |
| 9,628,108 B2 | 4/2017 | Ignomirello |
| D786,258 S | 5/2017 | Ignomirello |
| 9,672,054 B1 | 6/2017 | Gupta et al. |
| 9,715,347 B2 | 7/2017 | Ryu et al. |
| 9,753,768 B2 | 9/2017 | Chandrasekaran |
| 9,766,945 B2 | 9/2017 | Gaurav et al. |
| 2002/0122597 A1 | 9/2002 | Kikuchi et al. |
| 2002/0172203 A1 | 11/2002 | Ji et al. |
| 2003/0018759 A1 | 1/2003 | Baumann |
| 2003/0115447 A1 | 6/2003 | Pham et al. |
| 2003/0122694 A1 | 7/2003 | Green |

(56) References Cited

U.S. PATENT DOCUMENTS

| | | |
|---|---|---|
| 2004/0017651 A1 | 1/2004 | Gan et al. |
| 2004/0143733 A1 | 7/2004 | Ophir et al. |
| 2004/0262409 A1 | 12/2004 | Crippen et al. |
| 2005/0044447 A1* | 2/2005 | Dunstan ............... G06F 1/3203 714/14 |
| 2005/0091440 A1 | 4/2005 | Isa et al. |
| 2005/0099319 A1 | 5/2005 | Hutchison et al. |
| 2005/0191520 A1 | 9/2005 | Guntermann et al. |
| 2005/0198076 A1 | 9/2005 | Stata et al. |
| 2005/0210314 A1 | 9/2005 | Iguchi |
| 2005/0288800 A1 | 12/2005 | Smith et al. |
| 2006/0006517 A1 | 1/2006 | Lee et al. |
| 2006/0049956 A1 | 3/2006 | Taylor et al. |
| 2006/0171050 A1 | 8/2006 | Hanson et al. |
| 2006/0174140 A1 | 8/2006 | Harris et al. |
| 2006/0212644 A1 | 9/2006 | Acton et al. |
| 2006/0212692 A1 | 9/2006 | Ueno |
| 2006/0248273 A1 | 11/2006 | Jernigan, IV |
| 2006/0256866 A1 | 11/2006 | Ziauddin et al. |
| 2006/0285287 A1 | 12/2006 | Chen et al. |
| 2007/0081320 A1 | 4/2007 | Gilbert |
| 2007/0087586 A1 | 4/2007 | Karamooz |
| 2007/0101074 A1 | 5/2007 | Patterson |
| 2007/0164875 A1 | 7/2007 | Fredericks et al. |
| 2007/0180207 A1 | 8/2007 | Garfinkle |
| 2007/0206375 A1 | 9/2007 | Piepgras et al. |
| 2007/0236334 A1 | 10/2007 | Borovoy et al. |
| 2007/0291934 A1 | 12/2007 | Volkovs et al. |
| 2008/0005380 A1 | 1/2008 | Kawasaki et al. |
| 2008/0054845 A1 | 3/2008 | Wang |
| 2008/0059702 A1 | 3/2008 | Lu et al. |
| 2008/0062020 A1 | 3/2008 | Lakus-Becker |
| 2008/0077586 A1 | 3/2008 | Lam |
| 2008/0133835 A1 | 6/2008 | Zhu et al. |
| 2008/0291664 A1 | 11/2008 | Pesenti |
| 2008/0307128 A1 | 12/2008 | Amron |
| 2008/0310628 A1 | 12/2008 | Fujioka |
| 2009/0006640 A1 | 1/2009 | Brouwer |
| 2009/0040032 A1 | 2/2009 | Gerber |
| 2009/0055593 A1 | 2/2009 | Satoyama et al. |
| 2009/0061756 A1 | 3/2009 | Germagian |
| 2009/0100236 A1 | 4/2009 | Puig |
| 2009/0112880 A1 | 4/2009 | Oliveira et al. |
| 2009/0115646 A1 | 5/2009 | Duxbury |
| 2009/0119468 A1 | 5/2009 | Taylor et al. |
| 2009/0129691 A1 | 5/2009 | Luttmer et al. |
| 2009/0141435 A1 | 6/2009 | Kreiner et al. |
| 2009/0169001 A1 | 7/2009 | Tighe et al. |
| 2009/0193161 A1 | 7/2009 | Yoshida |
| 2009/0208221 A1 | 8/2009 | Sasai |
| 2009/0231153 A1 | 9/2009 | Hauenstein et al. |
| 2009/0300301 A1 | 12/2009 | Vaghani |
| 2009/0303709 A1 | 12/2009 | Weatherley |
| 2009/0307251 A1 | 12/2009 | Heller et al. |
| 2010/0076527 A1 | 3/2010 | Hammond et al. |
| 2010/0162039 A1 | 6/2010 | Goroff et al. |
| 2010/0169287 A1 | 7/2010 | Klose |
| 2010/0211737 A1 | 8/2010 | Flynn et al. |
| 2010/0245665 A1 | 9/2010 | Chrnega et al. |
| 2010/0250501 A1 | 9/2010 | Mandagere et al. |
| 2010/0253617 A1 | 10/2010 | Lio et al. |
| 2010/0257269 A1 | 10/2010 | Clark |
| 2010/0306294 A1 | 12/2010 | Schneider |
| 2010/0332862 A1* | 12/2010 | Lester .................. G11C 5/141 713/300 |
| 2011/0035361 A1 | 2/2011 | Soga |
| 2011/0107112 A1 | 5/2011 | Resch |
| 2011/0137519 A1 | 6/2011 | Christie |
| 2011/0170872 A1 | 7/2011 | Shin et al. |
| 2011/0208914 A1* | 8/2011 | Winokur ............ G06F 12/0804 711/119 |
| 2011/0276771 A1 | 11/2011 | Tajima et al. |
| 2011/0289294 A1 | 11/2011 | Maeda et al. |
| 2012/0054524 A1* | 3/2012 | Ben-Tsion .......... G06F 1/3203 713/324 |
| 2012/0076298 A1 | 3/2012 | Bolotov et al. |
| 2012/0124282 A1 | 5/2012 | Frank et al. |
| 2012/0131293 A1 | 5/2012 | Benhase et al. |
| 2012/0159282 A1 | 6/2012 | Ito |
| 2012/0166448 A1 | 6/2012 | Li et al. |
| 2012/0166757 A1 | 6/2012 | Volvovski et al. |
| 2012/0191982 A1 | 7/2012 | Levin |
| 2012/0209448 A1 | 8/2012 | Brower |
| 2012/0209559 A1 | 8/2012 | Brower |
| 2012/0239860 A1 | 9/2012 | Atkisson et al. |
| 2012/0246472 A1 | 9/2012 | Berengoltz |
| 2012/0278382 A1 | 11/2012 | Faith |
| 2012/0278553 A1 | 11/2012 | Mudhiganti et al. |
| 2012/0285738 A1 | 11/2012 | Cochrane et al. |
| 2012/0303359 A1 | 11/2012 | Mizuguchi et al. |
| 2012/0330894 A1 | 12/2012 | Slik |
| 2013/0013618 A1 | 1/2013 | Heller et al. |
| 2013/0019076 A1 | 1/2013 | Amidi et al. |
| 2013/0106297 A1 | 5/2013 | Yeh |
| 2013/0111166 A1 | 5/2013 | Resch et al. |
| 2013/0138764 A1 | 5/2013 | Satapathy |
| 2013/0211608 A1 | 8/2013 | Farrell et al. |
| 2013/0212161 A1 | 8/2013 | Ben-Shaul et al. |
| 2013/0268812 A1 | 10/2013 | Liu et al. |
| 2013/0283038 A1 | 10/2013 | Kulkarni et al. |
| 2014/0062307 A1 | 3/2014 | Spencer et al. |
| 2014/0082324 A1 | 3/2014 | Elhamias et al. |
| 2014/0119028 A1 | 5/2014 | Sato et al. |
| 2014/0146514 A1 | 5/2014 | Yahata |
| 2014/0211423 A1 | 7/2014 | Nguyen et al. |
| 2014/0223118 A1 | 8/2014 | Ignormirello |
| 2014/0223196 A1 | 8/2014 | Ignormirello |
| 2014/0258533 A1 | 9/2014 | Antony |
| 2014/0259014 A1 | 9/2014 | Watanabe et al. |
| 2014/0279911 A1 | 9/2014 | Ignormirello |
| 2014/0281257 A1 | 9/2014 | Hochberg et al. |
| 2014/0297938 A1 | 10/2014 | Puthiyedath et al. |
| 2014/0313043 A1 | 10/2014 | Heydron |
| 2014/0313700 A1 | 10/2014 | Connell et al. |
| 2014/0333449 A1 | 11/2014 | Thiesfeld et al. |
| 2015/0015405 A1 | 1/2015 | Bark et al. |
| 2015/0052282 A1 | 2/2015 | Dong |
| 2015/0058543 A1 | 2/2015 | Chan et al. |
| 2015/0084270 A1 | 3/2015 | Lo et al. |
| 2015/0095443 A1 | 4/2015 | Yang et al. |
| 2015/0098205 A1 | 4/2015 | Keranen et al. |
| 2015/0117019 A1 | 4/2015 | Kuenzler et al. |
| 2015/0131965 A1 | 5/2015 | Yoshioka |
| 2015/0163060 A1 | 6/2015 | Tomlinson et al. |
| 2015/0211916 A1 | 7/2015 | McGinn et al. |
| 2015/0212263 A1 | 7/2015 | Tzeng |
| 2015/0254092 A1 | 9/2015 | Chandrasekran |
| 2015/0309839 A1 | 10/2015 | Lu |
| 2015/0324388 A1 | 11/2015 | Benke et al. |
| 2016/0011802 A1 | 1/2016 | Berke |
| 2016/0043484 A1 | 2/2016 | Brodsky et al. |
| 2016/0085022 A1 | 3/2016 | Yang et al. |
| 2016/0092203 A1 | 3/2016 | Filali-Adib et al. |
| 2016/0196158 A1 | 7/2016 | Nipane et al. |
| 2016/0217047 A1 | 7/2016 | Ignormirello et al. |
| 2016/0218737 A1 | 7/2016 | Ignomirello |
| 2016/0232839 A1 | 8/2016 | Ignomirello |
| 2016/0378547 A1 | 12/2016 | Brouwer et al. |
| 2017/0026172 A1 | 1/2017 | Ignomirello |
| 2017/0220498 A1 | 8/2017 | Ignomirello |
| 2017/0221322 A1 | 8/2017 | Ignomirello |

FOREIGN PATENT DOCUMENTS

| | | |
|---|---|---|
| CN | 201426214 Y | 3/2010 |
| CN | 102611560 A | 7/2012 |
| CN | 203327301 U | 12/2013 |
| EP | 0403232 A2 | 12/1990 |
| EP | 2393009 A1 | 12/2011 |
| EP | 2897018 A1 | 7/2015 |
| GB | 2407427 A | 4/2005 |
| JP | H07-504541 A | 5/1995 |
| JP | 2000-31831 A | 1/2000 |
| JP | 2007-272826 | 10/2007 |

(56) References Cited

FOREIGN PATENT DOCUMENTS

| JP | 2007-281763 | A  | 10/2007 |
|----|-------------|----|---------|
| JP | 2008-107615 | A  | 5/2008  |
| JP | 2008-165293 |    | 7/2008  |
| JP | 2009-251725 |    | 10/2009 |
| JP | 2010-512057 | A  | 4/2010  |
| JP | 2010072740  |    | 4/2010  |
| JP | 2011-203842 |    | 10/2011 |
| JP | 2012-027587 |    | 2/2012  |
| JP | 2012-80470  | A  | 4/2012  |
| JP | 2012-129785 | A  | 7/2012  |
| WO | WO 2006/042019 | A2 | 4/2006 |
| WO | WO 2006/042041 | A2 | 4/2006 |
| WO | WO 2010/138824 | A2 | 12/2010 |
| WO | WO 2012/117658 |    | 7/2012 |
| WO | WO 2014/121102 | A2 | 8/2014 |
| WO | WO 2014/170617 | A1 | 10/2014 |
| WO | WO 2015/039181 | A1 | 3/2015 |

OTHER PUBLICATIONS

"Disk Cloning and Mass System Deployment" retrieved from http://www.drive-image.com/Disk_Cloning_and_Mass_System_Deployment.shtml, 21 pages.

"Enabling Memory Reliability, Availability, and Serviceability Features on Dell PowerEdge Servers," http://citeseerx.ist.psu.edu/viewdoc/download?doi=10.1.1.692.4199&rep=rep1&type=pdf, Dell Power Solutions, Aug. 2015.

"IBM TotalStorage Enterprise Server Model 800", IBM, retrieved from http://ps-2.kev009.com/rs6000/manuals/SAN/ESS/ESS800_Product_Data_sheet.pdf, dated 2003, 6 pages.

"Lenovo Servers RAS Features," https://youtu.be/zZyDxnCUE4c, Jan. 11, 2016.

"Memory RAS technologies for HPE ProLiant/Synergy/Blade Gen10 servers with Intel Xeon scalable processors", retrieved from https://www.hpe.com/h20195/V2/GetPDF.aspx/4AA4-3490ENW.pdf, Hewlett Packard Enterprises, Oct. 2017, 9 pages.

"Ntfsclone-Efficiently clone, image, restore or rescue an NTFS", Ubuntu, retrieved from http://manpages.ubuntu.com/manpages/gutsy/man8/ntfsclone.8.html, 4 pages.

"Restore a System Image BackUp to Computer with Dissimilar Hardware", AOMEI, retrieved from http://www.backup-utility.com/features/dissimilar-hardware-restore.html, 5 pages.

"Revisiting Memory Errors in Large-Scale Production Data Centers: Analysis and Modeling of New Trends from the Field" by Justin Meza, Qiang Wu, Sanjeev Kumar, and Onur Mutlu, Carnegie Mellon University and Facebook, Inc., 2015 {Facebook fleet analysis over 14 months}.

Alibaba, "new arrival fashion design zinc alloy metal U shap handle for leather of bag accessories qifeng f-994", retrieved on Jul. 18, 2015 from http://alibaba.com/product-detail/new-arrival-fasion-design-zinc-alloy_1402892576.html?smToken=f4543babcb5440fda870ba4c2a621f1c&smSign=2q%Bp5jXRBjWkFnOu62%2Fy%2Fw%3D%3D, 1 page.

Aliexpress, "F238F 3.5" Hot-Swap SAS/SATA Hard Disk Drive Caddy/Tray", retrieved on Jul. 14, 2015 from http://www.aliexpress.com/store/product/F238F-3-5-Hot-Swap-SAS-SATA-Hard-Disk-Drive-Caddy-Tray/1129178_1677183967.html, 1 Page.

All Data Parts, "Icy Dock ToughArmor MB992SK", retrieved on Jan. 29, 2016 from http://www.alldataparts.com/index.php?main_page=product_info&cPath=59_699_714&products_id=65914&zenid=c7a2e4f22f81deb6482a7df9318ad922, 2 pages.

American Standard Circuits, Inc., "High Temperature Organic Adhesive Bonding Films", retrieved from http://www.asc-i.com/preview/technology/thermal-managemenl/, on May 26, 2015, 5 pages.

Anonymous: "Find Seed from Random Numbers", Blitz Research Programming Forums, Dec. 4, 2011 (Dec. 4, 2011), XP055297586, retrieved from the Internet: http://web.archive.org/web/20111204053405/http://blitzbasic.com/Community/posts.php?topic=61025 (5 pages total).

Anonymous: "Huffman Coding", Wikipedia, the free encyclopedia, Jan. 18, 2013 (Jan. 18, 2013), pp. 1-10, XP055303125, Retrieved from the Internet: http://en.wikipedia.org/w/index.phptitle=Huffmancoding&oldid=533661878 [retrieved on Sep. 15, 2016] (10 pages total).

Anonymous: "Zero suppression", Wikipedia, the free encyclopedia, Jul. 25, 2012 (Jul. 25, 2012), XP055303438, Retrieved from the Internet: http://en.wikipedia.org/w/index.php?title=Zerosuppression&oldid=504088023 (retrieved on Sep. 16, 2016) (2pages total).

Backblaze, "Backblaze Faceplates", Sep. 8, 2015, retrieved on Jan. 29, 2016 from hllps://www.backblaze.com/blog/the-next-backblaze-face-plate/, 9 pages.

Cclonline, "Cougar MX300 Gamer Case, ATX, No PSU, Max 7 Fans, 7 PCI Cards, USB 3.0, Honeycomb Front", retrieved on Jul. 14, 2015 from http://www.cclonline.com/product/167472/MX300/Cases/COUGAR-MX300-Gamer-Case-ATX-No-PSU-Max-7-Fans-7-PCI-Cards-USB-3-0-Honeycomb-Front/CAS1679/, 2 pages.

Chapter 15. "Cooling of Electronic Equipment", retrieved from http://highered.mheducation.com/sites/dl/free/0073398128/835451/Chapter15.pdf, 70 pages.

Checkline Europe, "ZT-DPU Digital Force Guage with luminescent display & remote sensor," retrieved on Jul. 17, 2015 from http://www.checkline-eurpe.co.uk/digital_force_gauges1/ZT-DPU, 6 pages.

Chung et al., "Low Tg Epoxy Adhesives for Thermal Management", retrieved from www.aitechnology.com/uploads/pdf/WHITE%20PAPER/lowTgEpoxy.pdf, 14 pages.

Cisco, "10 Gigabit Ethernet Switching for High-Performance, Rack-Optimized Server Switiching", retrived on Jul. 18, 2015 from http://www.cisco.com/c/en/us/products/collateral/switches/catalyst-4900-series-switches/product_data_sheet0900aecd80246552.html, 14 pages.

Cisco, "Cisco Catalyst 4948 10 Gigabit Ethernet Switch Data Sheet", retrieved on Jul. 20, 2015 from http://www.cisco.com/c/en/us/products/collateral/switches/catalyst-4900-series-switches/product_data_sheet0900aecd80246552.html, 14 pages.

Cisco, "Cisco HDT Network Storage Hard Drive Trays Cisco Small Business Network Storage Systems", retrieved on Jul. 20, 2015 from http://www.cisco.com/c/en/us/products/collateral/storage-networking/hdt-network-storage-hard-drive-trays/data_sheet_c78-502733.pdf, 3 pages.

Cisco, "Replacing Cisco ASR 9000 Series Router Components", retrieved on Jan. 29, 2016 from http://www.cisco.com/c/en/us/td/docs/routers/asr9000/hardware/installation/guide/asr9kHIGbk/asr9kIGmaintaining.html, 15 pages.

Cisco, "Replacing the Cisco 3745 Faceplate/Fan Tray", manual, retrieved on Jul. 14, 2015 from http://www.cisco.com/public/scc/compass/3700/tasks-task_3745_faceplate_replace.htm, 1 Page.

Colo Advisor, "High Density Colocation—Planning Pays Off", retrieved on Jul. 18, 2015 from http://www.coloadvisor.com/blog/high-density-colocation-planning-pays-off/, 5 Pages.

D. Tang et al., "Assessment of the Effect of Memory Page Retirement on System RAS Against Hardware Faults," DSN, 2006.

Delcom Products, "USB Visual Signal Indicator RGB", retrieved on Apr. 4, 2016 from https://www.delcomproducts.com/productdetails.asp?prodcutnum=804000, 2 pages.

Dell, "Hard Disk Drive Caddy or Tray", retrieved on Jan. 29, 2016 from http://www.aliexpress.com/store/producl/F238F-3-5-Hot-Swap-SAS-SATA-Hard-Disk-Drive-Caddy-Tray/1129178_1677183967.html, 4 Pages.

Dell, "Installing Enclosure Components", retrieved on Jul. 18, 2015 from http://ftp.respmech.com/pub/MD3000/en/ MD3000_0wners_Manual/install.htm, 11 Pages.

Dhgate, 120mm Apexi 3 in 1 Guage hu's Store Dhgate, retrieved on Jul. 17, 2015 from http://webcache.googleusercontent.com/search?q=cache:YpQK9gy7APQJ:www.dhgate.com/store/product/120mm-apexi-3-in-1-guage-tachometer-rpm-water/141993290.html+&cd=6&hl=en&ct=clnk&gl=in, 3 pages.

Dictionary Techniques, C.M. Liu, National Chiao-Tung University Website, Dec. 31, 2010, website: http://people.cs.nctu.edu.tw/~cmliu/Courses/Compression/chap5.pdf, 137 pages.

(56) References Cited

OTHER PUBLICATIONS

Dram errors in the wild: a large-scale field study, Bianca Schroeder, Eduardo Pinheiro, Wolf-Dietrich Weber, Sigmetrics/Performance'09, Jun. 15-19, 2009, Seattle, WA, USA {largescale Google study for 2.5 years}.
Ebay, "Dell PowerEdge M610 Server 2XQUAD Core 2.8GHz/X5560 64GB 2X300GB Raid Rails", retrieved on Jul. 18, 2015 from http://www.ebay.ca/itm/271899179228?rmvSB=true, 3 pages.
Ebay, "Vintage VGC Chrome Chevron Boomerang Drawer Cabinet Door Pulls Washington", retrieved on Jul. 18, 2015 from http://www.ebay.com/itmNintage-VGC-CHROME-Chevron-Boomerang-DRAWER-Cabinet-Door-Pulls-Washington/200818869564?trksid=p204 7675.c100005.m1851&_trkparms=aid%3D222007%26algo%3DSIC.MBE% D26ao%3D1%26asc%3D32298%26meid%3D3280c5c9af794a00afd5a 1 a69fc33f59%26pid%3D, 1 Page.
Edwards Signaling, "125XBRi Series Xtra-Brite", Data Sheet ES001-0114, No. 1, retrieved on Apr. 4, 2016 from https://edwards-signals.com/files/125XBRI_Series_datasheet_v10.pdf, 2 pages.
European Search Report dated Sep. 5, 2016 in connection with corresponding EP Patent Application No. 16165443.9 (9 pages total).
Extended European Search Report dated Sep. 19, 2016 issued in connection with corresponding EP Application No. 14745861.6 (9 pages total).
Extended European Search Report dated Aug. 10, 2016 issued in connection with corresponding EP Application No. 14745756.8 (9 pages total).
EZ-PC, "Infrastructure and Networking", retrieved on Jul. 18, 2015 from http://www.ez-pc.org/services/infrastruture, 3 pages.
Frostytech, "Copper Honeycomb Concept Heatsink—BBHS Thermal Solutions Corp", retrieved on Jul. 14, 2015 from http://www.frostytech.com/permalinkArch.cfm?NewsID=88219, 1 Page.
Gilbert, "The Bus (PCI and PCI-Express)", retrieved from hppt://www.yale.edu/pclt/PCHW/BUS.HTM on Apr. 28, 2015 dated Jan. 4, 2008, 5 pages.
Hague Registration No. DM/056877, retrieved on Jul. 18, 2015 from http://www.wipo.int/designdb/hague/en/showData.jsp?SOURCE=HAGUE&KEY=DM056877, 3 page.
Hardware Secrets, "Everything You Need to Know About the PCI Express", retrieved from http://www.hardwaresecrets.com/article/EverythingYouNeedtoKnowAboutthePCIExpress/190 on Jul. 12, 2012, 3 pages.
Hewlett Packard (HP), "Best Practices for HP BladeSystem Deployments using HP Serviceguard Solutions for HP-UX 11i", HP Publication No. 5697-0470, May 2010, pp. 1-26.
Highly Relable Systems, "RAIDFrame DAS 5000", retrieved on Jul. 18, 2015 from https://www.high-rely.com/products/raidframe5bay/ 1 page.
Highly Reliable Systems, "MPac-G2 Media Tray", retrieved on Jan. 29, 2016 from https:/lwww.high-rely.com/products/mpac-media/, 1 page.
Highly Reliable Systems, "Raid Frame 5 Bay", retrieved on Jan. 29, 2016 from https:/lwww.high-rely.com/products/raidframe5bay/, 1 page.
IDOTPC, "BR-0804 4pc/set Rackmount Half-1 U Joint Plate Kit", retrieved on Jul. 18, 2015 from http://www.idotpc.com, thestore/pc/BR-0804-4pc-set-Rackmount-Half-1U-Joint-Plate-Kit-p1343.htm, 1 Page.
Intel, "Intel 64 and IA-32 Architectures Optimization Reference Manual", Manual, Sep. 2014, 642.
International Computer Concepts Inc, "PCI & PCIe Overview/Comparision", retrieved from http://www.iccusa.com/comparepci/ on Apr. 28, 2015, 5 pages.
International Preliminary Report on Patentability dated Aug. 13, 2015 issued in connection with International Application No. PCT/US2014/014209, 8 pages.
International Preliminary Report on Patentability dated Aug. 13, 2015 issued in connection with International Application No. PCT/US2014/014225, 7 pages.

International Search Report and Written Opinion dated Apr. 14, 2017, issued in connection with corresponding International Application No. PCT/US2017/015544 (13 pages total).
International Search Report and Written Opinion dated Aug. 20, 2014 issued in connection with International Application No. PCT/US2014/014209, 5 pages.
International Search Report and Written Opinion dated Jan. 16, 2015 issued in connection with International Application No. PCT/US2014/014225, 2 pages.
International Search Report for International Application No. PCT/US17/24692 dated Jul. 27, 2017.
Japanese Office Action dated Sep. 20, 2016, issued in connection with corresponding Japanese Patent Application No. 2016-080683 with English Language translation (8 pages total).
Japanese Office Action dated Mar. 14, 2017, issued in connection corresponding JP Application No. 2016-080683 (9 pages total).
Koike et al. Analyse validity of dedup technology, Information Processing Association Reports, 2011, 6, "DVD-ROM", Japan, General Legal Entity, Information Processing Society, May 1, 2012, vol. 2012-EVA-37, No. 1, pp. 1 to 6.
Lillibridge, M., Eshghi, K., Bhagwat, D., Deolalikar, V., Trezise, G., and Camble, P. 2009. Sparse indexing: Large scale, inline deduplication using sampling and locality. In Proceedings of the 7th USENIX Conference on File and Storage Technologies (FAST). USENIX Association, Berkely, CA, 111-123.
Mactech, "NES Cartridge External Hard Drive", retrieved on Jul. 18, 2015 from http://www.mactech.com/category/ type-article/macmod-web-site/miscellaneous-mods, 2 Pages.
Makatos, Thano, et al., ZBD: Using Transparent Compression at the Block Level to Increase Storage Space Efficiency, IEEE Computer Society pp. 61-70 (2010).
Mccabe, "How to Add a Hard Drive to Your Windows Home Server", Information Week Network Computing, retrieved on Jul. 14, 2015 from http://www.networkcomputing.com/storage/how-to-add-a-hard-drive-to-your-windows-home-server-/d/d-id/1098397?, 3 Pages.
Oracle Corp, "I/O Domains and PCI Express Buses", retrieved from docs.oracle.com/cd/E1960401/8210406/configurepciexpressbusesacrossmultipledoms/index.html on Apr. 28, 2015, 3 pages.
Philips, "Philips AZ302/98 CD Sound Machine", retrieved on Feb. 5, 2016 from http://www.naaptol.com/portable-speakers/philips-az302/p/641367.html, 3 pages.
Saduqulla et al., "Threshold Proxy Re-Encryption in Cloud Storage System", International Journal of Advanced Research in Computer Science and Software Engineering, vol. 3, Issue 11, retrieved from http://www.ijarcsse.com/docs/papers/Volume_3/11_November2013/V3/11-0332.pdf, dated Nov. 2013, 5 pages.
Samsung Memory DDR4 SDRAM, http://www.samsung.com/us/dell/pdfs/DDR4_Brochure_2015.pdf, Samsung Electronic Co., 2 pages, 2015.
Seagate, SCSI Commands Reference Manual (Feb. 14, 2006).
Smith, Steven W. Data Compression Tutorial: Part 1,: EE Times, Jun. 14, 2007.
Startech, "Hot Swap Hard Drive Tray for SATSASBAY3BK", retrieved on Feb. 1, 2016 from http://www.startech.com/HDD/Mobile-Racks/Extra-25inch-or-35inch-Hot-Swap-Hard-Drive-Tray-for-SATSASBAY3BK~SATSASTRAYBK, 3 pages.
Sun Microsystems, Best Practices for Sun StorEdge 6920 System (Nov. 2004).
Symbolic IO Corporation, International Search Report and Written Opinion dated May 3, 2016, for PCT/US16/25988, 8 pages.
Tate, Jon, et al., Real-time Compression in SAN Volume Controller and the Storwize V 7000, IBM (Aug. 17, 2012).
Weil, Sage A., Crush: Controlled, Scalable, Decentralized Placement of Replicated Data; IEEE—2006; p. 1-12.
Wylie et al., "Selecting the right data distribution scheme for a survivable storage system", CMU-CS-01-120, Carnegie Mellon University, retrieved from http://www.pdl.cmu.edu/PDL-FTP/Storage/CMU-CS-01-120.pdf, dated May 2001, 23 pages.
Xilinx, Inc., Virtex-5 Family Overview, Feb. 6, 2009, 13 pages.

(56) References Cited

OTHER PUBLICATIONS

"Elastic Online Analytical Processing on RAMCloud4," Tinnefeld et al., EDBT/ICTD (Mar. 18-22, 2013), available at https://openproceedings.org/2013/conf/edbt/TinnefeldKGBRSP13.pdf.
"RamCloud Project", accessed Apr. 3, 2018, available at https://ramcloud.atlassian.net/wiki/spaces/RAM/overview.
"Breakthrough Nonvalatile Memory Technology," Micron, 3D Xpoint Technology, accessed Apr. 3, 2018, available at https://www.micron.com/products/advanced-solutions/3d-xpoint-technology.

* cited by examiner

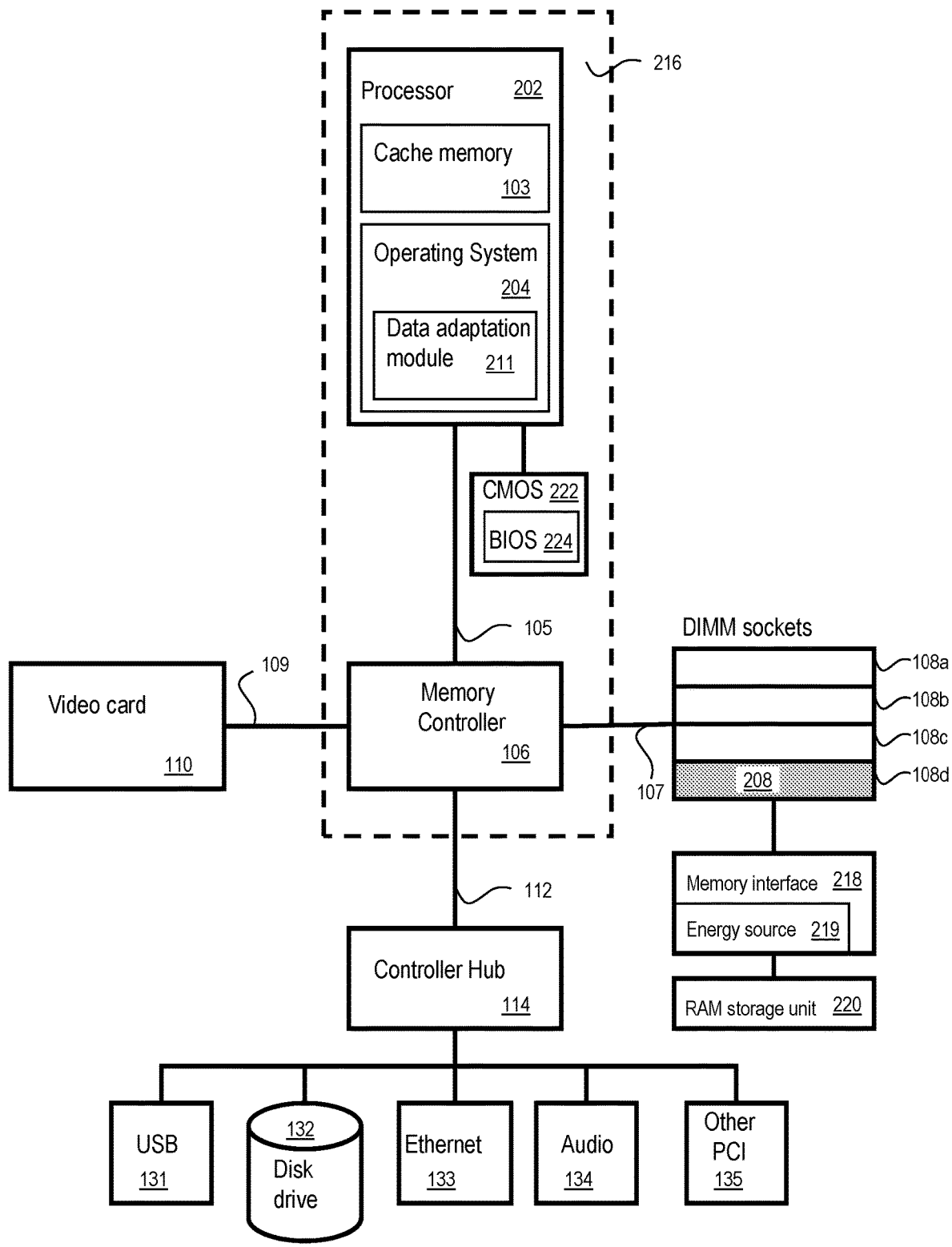
FIG. 2    200

FAST SYSTEM STATE CLONING

CROSS-REFERENCE TO RELATED APPLICATIONS

This application is a continuation of U.S. patent application Ser. No. 15/728,347, filed Oct. 9, 2017, which is a continuation of U.S. patent application Ser. No. 15/089,837, filed Apr. 4, 2016, which is a continuation-in-part of U.S. patent application Ser. No. 14/804,175, filed on Jul. 20, 2015, which in turn claims the benefit of U.S. Provisional Patent Application Ser. No. 62/148,160, filed on Apr. 15, 2015. U.S. patent application Ser. No. 15/089,837 also is a continuation: in: part of U.S. patent application Ser. No. 13/908,239, filed Jun. 3, 2013, which in turn is a continuation-in-part both of application Ser. No. 13/797,093, filed on Mar. 12, 2013, and of application Ser. No. 13/756,921, filed on Feb. 1, 2013. U.S. patent application Ser. No. 15/089,837 claims the benefit of U.S. Provisional Patent Application Ser. No. 62/202,983, filed on Aug. 10, 2015. The entire disclosure of each of the afore-referenced priority applications is incorporated by reference into the instant specification.

BACKGROUND

Field

Embodiments of the present invention generally relate to system cloning and, in particular, to a fast apparatus and method to clone a system for backup or replication.

Description of Related Art

Computer systems of varying scopes or deployment are used throughout a typical large enterprise. Enterprise-level computer systems are systems that may be used throughout an enterprise or to support enterprise-critical functions. For example, for an airline company, a reservation and booking system or a flight scheduling system may be an enterprise-level system. At a lower level of deployment, other systems (e.g., a department-level or functional-level system) may support a departmental-level organization or support a limited function. For example, department-level systems for an airline company may support one of accounting, sales and marketing, engineering, maintenance support, and so forth. At an even lower level, a computer system (either a real system or a virtual system such as a cloud-based system) may support individual employees.

A computer system may be characterized by its hardware and software assets, status, system state, and the like. Hardware characterization may include a list of servers used, memory and memory storage space available, communication links available, router connectivity, and so forth. Characterization of software assets may include a list of operating systems and application programs available on each server. Characterization of system state may include a list of what software is presently executing on each server, the state of each software (e.g., as indicated by a finite state machine model), data in volatile and non-volatile memory accessible to and/or used by each software, and so forth.

At times, it is necessary or desirable to clone a computer system, e.g., for backup or capacity purposes. For example, a backup of a computer system may be made by cloning all or part of the computer system, e.g., cloning at least the system state but not necessarily the hardware characterization. On the other hand, cloning by way of replication may be made when it is necessary to quickly ramp up processing capacity or capabilities. For example, an online retail merchant may want to replicate temporarily its computer systems devoted to sales and marketing during the period from Thanksgiving to Christmas, and release those assets later. However, the online retail merchant may want to replicate temporarily its computer systems devoted to accounting at the end of its fiscal year.

At times, it is necessary or desirable to restore a computer system from backups. For example, if a sales system or web site of an online merchant crashes, the merchant may not have any sales until the sales system or web site is restored. Therefore, there would be a need to restore such systems from backups as soon as possible.

Existing methods for cloning systems suffer from a variety of drawbacks. For example, a hot standby (e.g., a system that is constantly active and mirroring the state of a primary system) may be expensive in terms of hardware required, software licenses needed and maintenance cost (e.g., for utilities and staff), particularly for larger systems. Multiple virtual machines and hypervisors are also potentially expensive in terms of hardware and software if they are constantly kept hot. Cold standby backup systems (e.g., a backup brought online only when needed, such as upon primary system failure) may take an undesirably long time to take over for a failed system, and may not reflect the most recent state of the primary system prior to failure.

Therefore, a need exists to provide a system and method to clone computer systems quickly yet at low cost.

BRIEF SUMMARY

In one embodiment, a system clone is made by copying all or part of the present memory contents of an application server system, using fast methods and architecture described herein. The system clone then may be used as a backup, to increase enterprise capacity, to repurpose computing assets, and so forth.

A method to clone a source computing system in accordance with an embodiment of the present disclosure may include the steps of selecting a memory space coupled to the source computing system, retrieving uncoded data from the selected memory space, encoding the uncoded data by use of a bit-marker-based encoding process executing on a backup server, storing encoded data in a protected memory coupled to the backup server, wherein the protected memory is protected from a power interruption, retrieving the encoded data from the protected memory, and decoding the encoded data onto a target computing system, wherein the target computing system is separate from the source computing system.

A system to clone a source computing system in accordance with an embodiment of the present disclosure may include a processor coupled to a memory, the memory providing a memory space for the source computing system, a communication interface to support retrieval of uncoded data from the memory space, an encoder to encode the uncoded data by use of a bit-marker-based encoding process executing on a backup server, a storage module to store encoded data in a protected memory coupled to the backup server, wherein the protected memory is protected from a power interruption, a communication interface to support retrieval of the encoded data from the protected memory, and a decoder to decode the encoded data onto a target computing system, wherein the target computing system is separate from the source computing system.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 2 illustrates a functional block diagram of a PC-based cloning server in accordance with an embodiment of the present disclosure;

Figure 1:
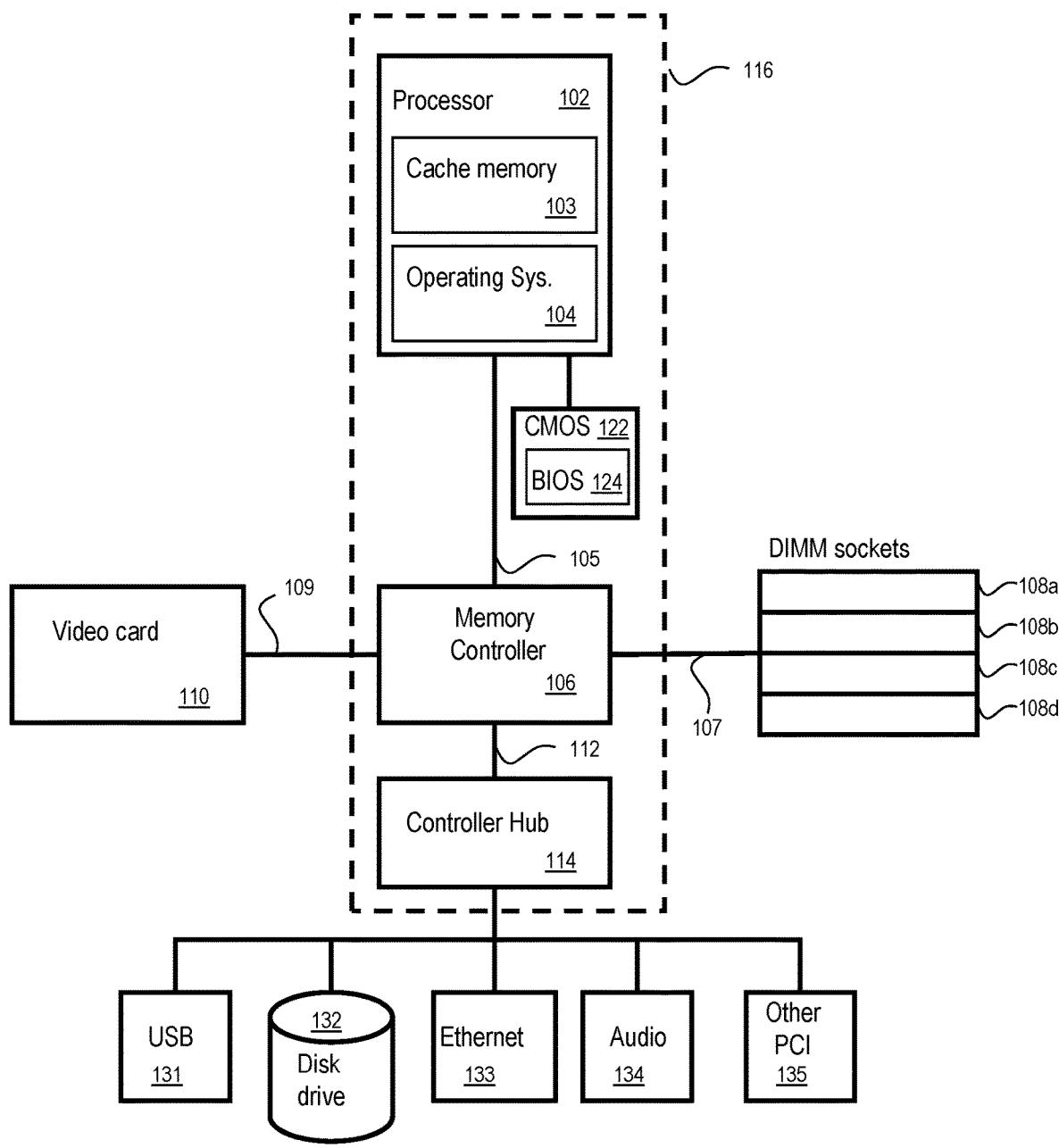
FIG. 1 illustrates a functional block diagram of a personal computer (PC) based server as known in the art.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with exemplary use cases, method embodiments, and system embodiments. Although well suited for use with, e.g., a system using servers, networking equipment and/or specialized instrumentation, the disclosure is not limited to use with any particular type of electronic system or configuration of system elements. Those skilled in the art will recognize that the disclosed techniques may be used in any electronic system in which it is desirable to replicate, clone, backup or restore a computer system.

Embodiments in accordance with the present disclosure will be described in relation to associated hardware. However, to avoid unnecessarily obscuring the present disclosure, the following description omits well-known structures, components and devices that may be shown in block diagram form, are well known, or are otherwise summarized. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

A module that performs a function also may be referred to as being configured to perform the function, e.g., a data module that receives data also may be described as being configured to receive data. Configuration to perform a function may include, for example: providing and executing computer code that performs the function; providing provisionable configuration parameters that control, limit, enable or disable capabilities of the module (e.g., setting a flag, setting permissions, setting threshold levels used at decision points, etc.); providing a physical connection, such as a jumper to select an option, or to enable/disable an option; attaching a physical communication link; enabling a wireless communication link; providing electrical circuitry that is designed to perform the function without use of a processor, such as by use of discrete components and/or non-CPU integrated circuits; energizing a circuit that performs the function (e.g., providing power to a transceiver circuit in order to receive data); and so forth.

The parent of the present patent application (U.S. patent application Ser. No. 14/804,175, "the '175 Application") discloses a system for a high-capacity and fast transfer rate digital storage. Bit marker technology used in the '175 Application and herein is described in CIP parent application U.S. patent application Ser. No. 13/908,239 ("the '239 Application). When a computer system can be characterized at least in part by a digital state of its software assets, status and system state, then embodiments in accordance with the present disclosure may use the system of the parent disclosure in order to clone a digital state very quickly. System restoral may be performed commensurately quickly.

The methods, components and systems disclosed in the '175 Application and used in the present embodiments include a hypervisor, a server processor, a customized operating system and/or a guest operating systems (OSs) in the hypervisor, data or drives associated with the guest OSs. Embodiments are able to integrate into substantially any network via networking components (e.g., Ethernet adapters). Embodiments may further include conventional RAM volatile memory, and a non-volatile DIMM memory (NV-DIMM) that is protected from data loss as disclosed in the '175 Application. Systems may further include PCIe, peripheral devices and structuring.

The data being imaged and represented may include substantially any data stored in the volatile RAM, e.g., databases, application programs, logs, proprietary data, and so forth. Application programs may include: various services executing at an operating system level such as a firewall service, a document service, etc.; various software executing at a user level such as a spreadsheet, word processor, graphics editing, CAD/CAM software, accounting software, etc.; and various servers, such as a web server, a mail server, a database server, and so forth.

FIG. 1 illustrates a functional block diagram of a conventional computer system 100 as known in the art. System 100 may be used, for example, in a computer system based upon an Intel®-compatible architecture. As fabrication technology advances, various functional components may be fabricated in different integrated circuit (IC) configurations, depending upon factors such as generation of chipset, price-to-performance ratio of the targeted customer, targeted computing platform (e.g., mobile devices, servers, etc.), and so forth. Certain functions may be combined into various configurations such as in a single IC, such as an IC 116.

System 100 includes a processor 102, which may be a general-purpose processor such as Xeon®, Intel Core i7®, i5®, i3®, or processors from Advanced Micro Devices® (AMD) such as Athlon64®, and the like. In other embodiments, processor 102 may be a graphics processing unit (GPU). In the functional block diagram of FIG. 1, processor 102 as used herein may refer to the functions of a processor, and/or refer to the one or more hardware cores of a processor. Processor 102 may include multiple processing cores that operate at multi-GHz speeds. Processor 102 may include a cache memory 103 (e.g., L1 or L2 cache). Processor 102 also may be programmed or configured to include an operating system 104. Examples of operating system 104 include various versions of Windows®, Mac OS®, Linux®, and/or operating systems or operating system extensions in accordance with an embodiment of the present disclosure, and so forth. The registered trademark Windows is a trademark of Microsoft Inc. The registered trademark Mac OS is a trademark of Apple Inc. The registered trademark Linux is used pursuant to a sublicense from LMI, the exclusive licensee of Linus Torvalds, owner of the mark on a world-wide basis. Operating system 104 performs conventional functions that include the running of an application program (not shown in FIG. 1). Functionally, operating system 104 is illustrated as being a part of processor 102, but portions of operating system 104 may physically reside in a non-volatile memory (e.g., a hard disk, solid-state drive (SSD), flash drive, NAND memory, non-volatile RAM, etc.), not illustrated in FIG. 1, and at least portions of operating system 104 may be read into RAM memory as needed for execution by processor 102.

Processor 102 may use several internal and external buses to interface with a variety of functional components. System 100 includes communication bus 105 that links processor 102 to memory controller 106. Memory controller 106 may also be referred to as a northbridge. Communication bus 105 may be implemented as one of a front side bus (FSB), a Non-Uniform. Memory Access (NUMA) bus, an EV6 bus, a Peripheral Component Interconnect (PCI) bus, and so forth.

System 100 further includes a nonvolatile memory 122 (e.g., a CMOS memory) coupled to processor 102. CMOS memory 122 may include a basic input/output system (BIOS) 124, which helps manage low-level communication among computer components, and may include storage of computer code to perform a power-on self-test. Conventionally, a power-on self-test may include a test of the data integrity of installed RAM.

Memory controller hub 106 typically handles communications between processor 102 and various high-speed functional components such as external RAM memory installed in dual in-line memory module (DIMM) slots 108a, 108b via communication bus 107, and video graphics card 110 via communication bus 109. Communication buses 107 and 109 may be high-speed interfaces, such as Peripheral Component. Interconnect Express (PCIe) or Accelerated Graphics Port (AGP). Memory controller hub 106 may also handle communications between processor 102 and controller hub 114, via communication bus 112. Controller hub 114 may also be known by other names such as a southbridge, an I/O Controller Hub (ICH), a Fusion Controller Hub (FCH), a Platform Controller Hub (PCH), and so forth. Controller hub 114 in turn manages further communication with additional and/or slower I/O devices or interfaces such as USB ports 131, storage media 132 with standard interfaces (e.g., ATA/SATA, mSATA, SAS, etc.), Ethernet transceivers 133, audio ports 134, other PCI devices 135, and so forth.

In some configurations of system 100 (not illustrated), processor 102 is designed to bypass memory controller 106 and communicate directly with controller hub 114 via a Direct Media Interface (DMI). Such configurations also may integrate the functions of processor 102 and memory controller 106 into a single IC 116. In such configurations, controller hub 114 is typically a Platform Controller Hub (PCH).

Although the memory chips that make up RAM memory installed in DIMM slots 108a, 108b may have a very high maximum access speed (e.g., about 57 GBytes/sec), communication bus 109 normally cannot support such fast speeds. For example, the speed of PCIe 4.0 in a 16-lane slot is limited to 31.508 GBytes/sec. AGP is slower still than PCIe. Therefore, communication bus 107 is a bottleneck that prevents faster memory access.

The bottleneck of memory access is one drawback of the conventional art. Other drawbacks described above of a conventional computer include the mismatch in storage size between the size of RAM memory (typically on the order of a few Gbytes) and the storage size of a conventional hard disk (typically on the order of a few Tbytes), and the relatively small storage size of RAM memory to the storage size of a conventional hard disk. Another drawback of the conventional art is the volatile nature of the RAM memory.

Embodiments in accordance with the present disclosure break the density issue that RAM has today. Embodiments in accordance with the present disclosure address these drawbacks of the conventional art by providing a novel hardware interface for storage units, and a novel driver interface for the hardware interface.

Outside of the CPU, RAM is the fastest element in x86 and x64 computing systems, so embodiments allows for the alignment of today's high speed RAM performance with a new method of achieving high storage density. As this effect is applied, it completely changes the cost paradigm and allows low cost memory modules to replace the need for high-density, high cost memory modules.

A remaining issue is the volatility of standard memory modules. Since all RAM is volatile, it does not lend itself to becoming a long-term storage medium. Embodiments are similar to but differ from non-volatile RAM (NVRAM) technology, which circumvents the volatility issue found in standard DIMM devices.

Embodiments in accordance with the present disclosure use a basic inexpensive x64 motherboard that can be powered by Intel® or AMD® CPU processors. The motherboard has a modified CME and BIOS that gives it the intelligence required to be Non-Volatile Memory aware. In addition, the motherboard provides to each memory module a DC supply voltage (e.g., 1.2 v, 1.35 v, 1.5 v, etc.) that may be used to charge environmentally-safe low-load, slow-drain capacitors. This design allows for shutdown state (e.g., loss of power or safe shutdown) to maintain data persistence within the memory module, thus making the memory module a viable long-term storage device.

FIG. 2 illustrates a functional block diagram of a computer system 200 in accordance with an embodiment of the present disclosure. Computer system 200 may also be referred to herein as a blink server. Functional components already described in FIG. 1 are assigned in FIG. 2 the same reference number as that shown in FIG. 1. System 200 includes a memory interface 218, which may be physically coupled to a DIMM slot (e.g., DIMM slot 108b) by use of a connector 208 such as a Molex® connector. Memory interface 218 communicates with processor 202 through DIMM slot 108b by use of conventional protocols on communication bus 107. Memory interface 218 is coupled physically and communicatively to RAM storage unit 220. Functions of memory interface 218 include communicatively coupling RAM storage unit 220 to communication bus 107, monitoring for certain events like state of health related to RAM storage unit 220, other hardware events, taking certain actions based upon detected signals or hardware events, and so forth. Functions of memory interface 218 also may include simple processing and housekeeping functions such as resolving memory addresses, reporting memory size, I/O control, keeping track of and reporting total power cycles, run time in an hour, reporting number of DIMMs, reporting status such as ultra capacitor (cap) current voltage, bus ready, last restore success or failure, device ready, flash status of the NAND area, cap connected, cap charge status, valid image present, DIMM init performed, read registers, and so forth. NAND may be known as a type of non-volatile IC-based storage technology that does not require power to retain data.

System 200 further includes a nonvolatile memory 222 (e.g., a CMOS memory) coupled to processor 202. CMOS memory 222 may include a basic input/output system (BIOS) 224, which helps manage low-level communication among computer components, and may include storage of computer code to perform a power-on self-test. Conventionally, a power-on self-test may include a test of the data integrity of installed RAM. Embodiments in accordance with the present disclosure may include a modified power-on self-test (as compared to the power-on self-test of BIOS 124), such that the power-on self-test may skip the test for at least some predetermined memory modules, e.g., if the test would be incompatible with the nature of data stored in the predetermined memory module.

Embodiments in accordance with the present disclosure also address the RAM volatility shortcoming of the known art by coupling an energy source 219 with RAM storage unit 220. Energy source 219 may be incorporated with memory interface 218. Energy source 219 is a source of backup power, such that if an external power supply to RAM storage unit 220 is lost (e.g., by way of an AC power failure affecting the entire computing system 200, removal of a battery powering a mobile system 200, motherboard failure, etc.), energy source 219 may provide sufficient power in order to maintain integrity of data stored in RAM storage unit 220.

Embodiments in accordance with the present disclosure include random access memory (RAM) organized as a combination of traditional volatile memory and non-volatile RAM module memory (NV-DIMM). The NV-DIMM memory is disclosed in the parent U.S. patent application Ser. No. 14/804,175 ("the '175 Application"), e.g., as the RAM storage unit 220. The proportion of each type of memory of the whole that is installed in a system may vary from system to system. For example, the total memory size may be selected at installation to be within a range of 8 GB to 160 GB or more, organized in eight banks, with two of the banks configured as conventional RAM memory and six banks configured as NV-DIMM.

Embodiments in accordance with the present disclosure may provide a system that operates in two modes. In a first mode, the entire content or address range of a conventional volatile memory of a source system (either of the present system or of an external system) may be selected to be imaged and represented by use of the methods disclosed in the '175 Application, and the representation stored in the NV-DIMM memory. This image or representation may also be known as a reference image. Embodiments may be communicatively coupled to an external system by use of a high-speed communication link such as 100 Gigabit Ethernet conforming to the IEEE 802.3ba-2010 standard.

In a second mode in accordance with an embodiment of the present disclosure, a subset of the entire conventional volatile memory address range of a source system may be selected to be imaged and represented, e.g., only a portion of the conventional volatile memory that is actively being utilized by processing running on the system being imaged and represented. In another variation of this embodiment, a fixed range subset of the entire conventional volatile memory address range may be imaged and represented. The fixed range subset does not necessarily need to be contiguous. In another variation of this embodiment, the subset of the address range being imaged and represented may represent a virtual server. For example, if a single physical server (e.g., used by a business enterprise) hosts more than one virtual server (e.g., one each for several departments in the business enterprise), embodiments may image and represent some but not all of the virtual servers. Such a capability may be useful if, e.g., the functions performed by the different servers have different backup needs (e.g., a virtual server for the finance department vs. a virtual server for the customer support department).

In some embodiments, the NV-DIMM may act as a repository to store a plurality of reference images representing, e.g., a single system over time, or multiple external systems, or a combination thereof. An NV-DIMM repository of multiple reference images may be used to support disaster recovery, e.g., an off-site location securely storing reference images for multiple enterprises.

After the data has been imaged, represented and stored in NV-DIMM memory, embodiments in accordance with the present disclosure may provide an "infrastructure in a box" capability. For example, once all the databases, applications, logs, proprietary data, and so forth that had been imaged and represented is replicated on a target hardware environment that mimics the original hardware environment, the system that had been imaged and represented may be replicated along with the system state of the original system at the time it had been imaged and represented.

A replicated copy may be useful for backup purposes with fast restoration, or to be able to provide expanded capacity on short notice. Whether a restoration is deemed fast may vary from one field of use to another, or one content to another. For example, a fast restoration for a CAD/CAM system may not be deemed to be a fast restoration for a computing system supporting financial market trading. A fast restoration for a computing system providing video distribution of movies on demand may not be deemed to be a fast restoration for a computing system providing video distribution of a live event like the Super Bowl. Similarly, what notice is deemed to be short notice may vary from one field of use to another or one content to another, and may be as short as a few seconds or less for a computing system that supports financial market trading. In some embodiments, short notice is less than about five seconds notice. In some embodiments, a fast restoration can be completed within about ten minutes of the detection of a need for restoration or receipt of a command to perform a restoration. In other embodiments, a fast restoration can be completed within about three minutes. In other embodiments, a fast restoration can be completed within ten seconds or less.

Traditional backups are a relatively infrequent occurrence (e.g., once per day, once per week, etc.) in which a system state must be frozen or at least changes to system state should be minimized during a traditional backup process (e.g., by users saving their work, exiting out of applications, etc., all of which cause disruption). In contrast, when replicated copies may be made more quickly, backups can be made more quickly, more timely, and more frequently, resulting in a more recent (i.e., less stale) copy of a system state in case a restoration is necessary. Frequent backups begin to resemble a snapshot of a system state. Frequent backups may be referred to herein as "blink" backups.

Changes to system state may be reduced during a blink backup, as described below in greater detail with respect to FIG. 3C. The frequency of blink backups may be configurable by a user or system administrator.

Analogizing to photography, a traditional backup is like a formal holiday family portrait that requires preparation (e.g., interrupting other activities in order to have the portrait taken, and staging—i.e., special poses, lighting, props, etc.). In contrast, embodiments are more like a video recording of a family, with each individual frame of the video representing a separate blink backup (albeit at a relatively slow frame rate compared to a video recording). The blink backup occurs quickly without necessarily requiring undue preparation, and therefore can be made frequently without disrupting operation of the system being blinked.

A blink backup may proceed first by identifying memory resources to be backed-up. For example, suppose an application-specific server is to be backed up. For example, the application-specific server to be backed up may be a virtual server dedicated to accounting functions, the virtual server being hosted on a physical server along with other virtual servers dedicated to other functions respectively such as sales and marketing, engineering department, etc. The server to be backed up customarily will keep a list of application programs executing on itself, along with their respective system resource usage. Embodiments may identify all system resources used by the application-specific server, as indicated by RAM memory ranges allocated to or used by all application programs currently running on the application-specific server being backed-up, address ranges of program code stored in a nonvolatile memory (e.g., storage media such as hard disk, solid-state drive (SSD), flash drive, NAND memory, non-volatile RAM, etc.), operating system configuration, and so forth. Embodiments may perform this collection as a high-priority data collection task, in order to minimize state or data changes to other application programs running on the application-specific server while the collection is taking place. The data collection task does not need to report its own memory usage.

Next, embodiments may retrieve the memory contents indicated by the identification task. Embodiments may then encode and store the memory contents in accordance with process 500 of FIG. 5A, described below in greater detail.

In some embodiments, a replicated copy may be generated by request from a source external to the system being replicated (e.g., a "pull" basis). In other embodiments, a replicated copy may be generated at a time determined by the system being replicated (e.g., a "push" basis). A push basis is similar to a scheduled backup.

Embodiments in accordance with the present disclosure also provide an ability to repurpose a computer hardware architecture upon short notice. For example, suppose that a web hosting company hosts several disparate web sites of interest, e.g., an e-commerce web site like Amazon™ using an average of 200 servers, an online trading web site like E-Trade™ using an average of 100 servers, and so forth. Further suppose that they use the same or similar computer hardware architecture constructed from standard components. The software components may be different, e.g., the e-commerce web site may be based upon an open-source operating system like Linux™, and the online trading web site may be based upon a commercial operating system like Microsoft Windows™. Utilization may vary over time, such that when one system is highly utilized the other system may be lightly utilized, and vice versa. In such a scenario, embodiments may quickly repurpose some servers from one web site to another. For example, if in the middle of a weekday the e-commerce web site is not busy but the online trading web site is busy, some number of servers (e.g., 40 servers) could be repurposed from e-commerce to online trading. Conversely, on a weekday evening when the e-commerce web site is busy but the online trading web site is not busy, some number of servers (e.g., 50 servers) could be repurposed from the online trading web site to the e-commerce web site. The repurposing may also be referred to as personality swapping.

For a server being repurposed from purpose "A" to purpose "B", repurposing may involve first copying or cloning a system state of a server currently devoted to purpose "B". The system state may include all memory currently being used, the operating system and all software currently executing, and so forth. Optionally, the current system state of the server currently devoted to purpose "A" but which will be repurposed may be saved for later restoration. Next, the system state cloned from purpose "B" will be restored on the server that was formerly devoted to purpose "A", thereby substantially instantaneously repurposing that server to purpose "B".

When repurposing, purpose "A" and purpose "B" may be substantially any server-based application, for either the same enterprise or different enterprises. For example, for a single enterprise such as a major toy retailer, purpose "A" may be sales systems that are in most demand before Christmas, and purpose "B" may be accounting systems that are in most demand at the end of the fiscal year.

Similarly, embodiments in accordance with the present disclosure may increase system capacity by repurposing servers from a spare status to an active status for a particular purpose. A spare status may be, e.g., a blank system that is populated with hardware but does not have usable software or data installed.

Embodiments in accordance with the present disclosure may facilitate combinations of system images. For example, a base system image may represent the operating system and/or certain computing infrastructure for the operating system, e.g., uncustomized servers such as a web server, a mail server, and so forth. The base system image may then be merged combined) with a custom image, which may represent system-specific customizations of the uncustomized servers, e.g., user accounts, histories, preferences, macros, specialized application programs, and so forth. Conversely, system blinks may be able to blink the customizations separately from the base system image, allowing the customizations to be backed up on a different schedule or with less latency compared to a backup of the base system image.

Figure 3A:
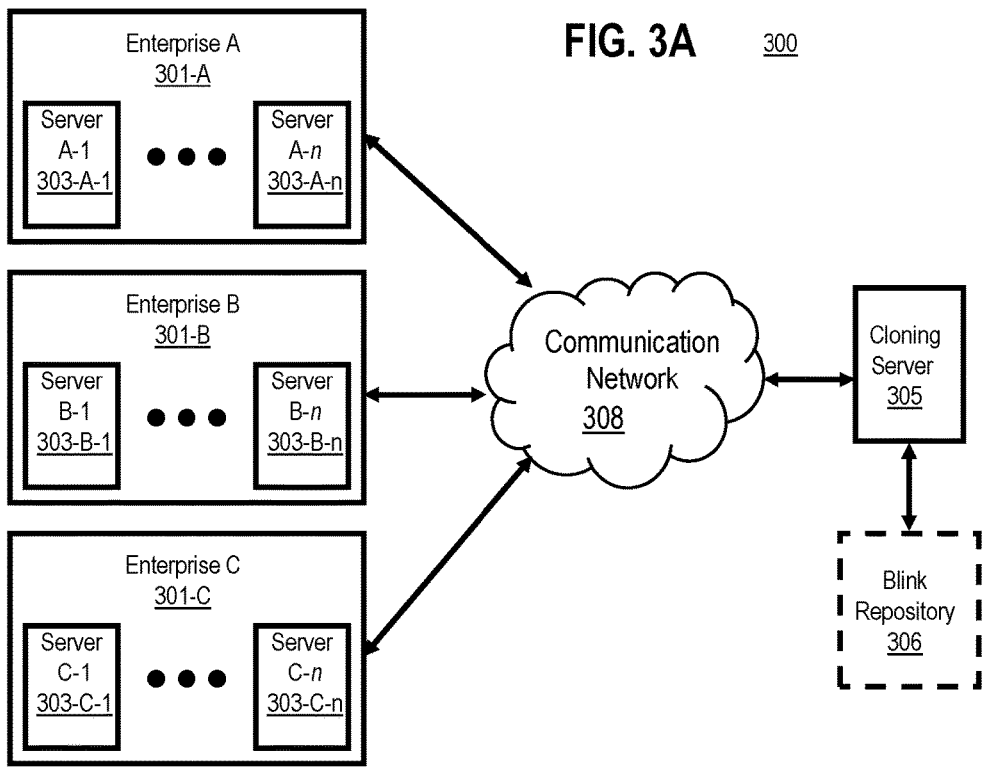
FIG. 3A illustrates a system in accordance with an embodiment of the present disclosure.

FIG. 3A illustrates a system 300 in accordance with an embodiment of the present disclosure. System 300 may be used to perform fast cloning. System 300 as illustrated includes an enterprise A 301-A, an enterprise B 301-B and enterprise C 301-C. Each enterprise may represent an entire company or organization, e.g., a gaming network, an online merchant, an online brokerage, a stock exchange, etc. System 300 may include fewer or more enterprise networks than depicted in FIG. 3A.

Each enterprise 301-n may include one or more servers, e.g., servers 303-A-1 through 303-A-n for enterprise A 301-A, servers 303-B-1 through 303-B-n for enterprise B 301-B, and servers 303-C-1 through 303-C-n for enterprise C 301-C. Individual servers within an enterprise may be utilized by the enterprise for different functions. For example, if enterprise A 301-A is an online merchant, then server 303-A-1 may be a web server, server 303-A-2 may be devoted to database and inventory management, server 303-A-3 may be devoted to billing and accounting, etc.

Each enterprise 301-n may be communicatively coupled to cloning server 305 through communication network 308. Cloning server 305 may be, e.g., computer system 200 as illustrated in FIG. 2. In operation, cloning server 305 may perform the process embodiments described herein upon external servers 303-m-n. For example, cloning server 305 may replicate server 303-B-1 onto server 303-B-2, or cloning server 305 may make a blink backup of server 303-C-1, and so forth.

In some embodiments, an optional separate blink repository 306 may store blink backups from one or more servers 303. Without a separate blink repository 306, blink backups may be stored within NV-DIMM memory of cloning server 305.

Figure 3B:
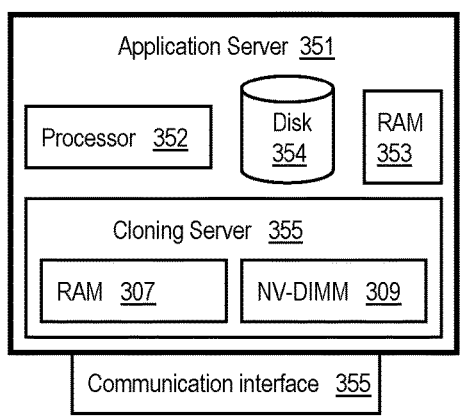
FIG. 3B illustrates another system in accordance with an embodiment of the present disclosure.

FIG. 3B illustrates a system 350 in accordance with an embodiment of the present disclosure. System 350 may be used to perform fast cloning of an application server 351 without the need for external access through a network. System 350 includes application server 351, which may be ordinary functions, for example, a web server, or a database server, or an accounting server, etc. Application server 351 may include a processor 352 coupled to conventional volatile RAM memory 353 and storage media 354 to support operation of application server 351 in its ordinary function. Communication interface 355 may provide communication connectivity between application server 351 and an external communication link (e.g., an Ethernet interface to a WAN or LAN).

However, application server 351 may have further embedded within it the functionality of cloning server 355, supported by conventional volatile RAM memory 307 and NV-DIMM 309. Cloning server 355 may be, e.g., computer system 200 as illustrated in FIG. 2. In operation, cloning server 355 may perform the process embodiments described herein upon application server 351. An advantage of system 350 compared to system 300 is that system 350 does not necessarily need access to a communication network such as communication network 308, because cloning server 355 is embedded within application server 351. Embedding may be accomplished by, e.g., processor 352 of application server 351, which executes code modules for both application server 351 and cloning server 355.

Alternatively, application server 351 may be implemented using computer system 200 as a starting point, then executing by operating system 204 additional software modules that provide the functionality of application server 351.

Figure 3C:
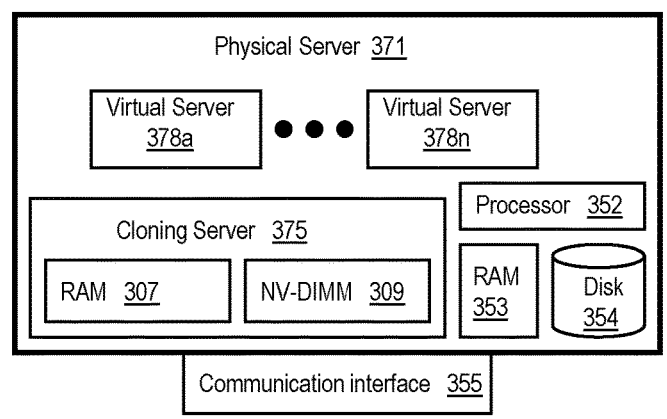
FIG. 3C illustrates a system with a virtual server, in accordance with an embodiment of the present disclosure.

FIG. 3C illustrates a system 370 in accordance with an embodiment of the present disclosure. System 370 includes a physical server 371, which in turn may include a cloning server 375 and one or more of the components of application server 351 (as indicated by like reference numbers), plus one or more virtual servers 378a . . . 378n (collectively, virtual servers 378). An individual but nonspecific one of virtual servers 378 may be referred to as virtual server 378. A hypervisor or other virtual machine monitor operating in processor 352 may manage physical server 371 and its resources in order to provide the appearance of virtual servers 378 to remote users, e.g., remote users coupled through communication interface 355. Virtual servers 378 may provide a respective guest operating system ("GOS"), e.g., for the benefit of a user (e.g., a remote user) who is coupled to the respective virtual server 378, and to support execution of application program(s) on the virtual server 378. Memory storage to support a virtual server 378 may be allocated from RAM 353, storage media 354, and/or provided by an external memory device (not illustrated in FIG. 3C).

In some embodiments, upon the occurrence of a blink backup, a virtual server 378, its respective GOS, memory resources and any application programs running on the GOS may temporarily enter a locked or suspended state for the duration of time it takes to perform the blink backup. The locked or suspended state reduces changes to system state or system configuration while the blink backup is taking place. At conclusion of the blink backup, elements that entered a locked or suspended state may automatically return to their normal state.

In some embodiments, a virtual server 378, its respective GOS, memory resources and any application programs running on the GOS may temporarily enter a quiescent state during a blink backup. A quiescent state may continue to execute transactions, but results may be held in resident memory rather than being committed to storage media. In contrast, a server in a hibernation mode may save a memory image to storage media and shut down without executing transactions while in hibernation mode. At conclusion of the blink backup, elements that entered a quiescent state may automatically return to their normal state.

In some embodiments, blink backups may be stored in an external blink repository, similar to blink repository 306, accessible via communication interface 355.

Figure 4:
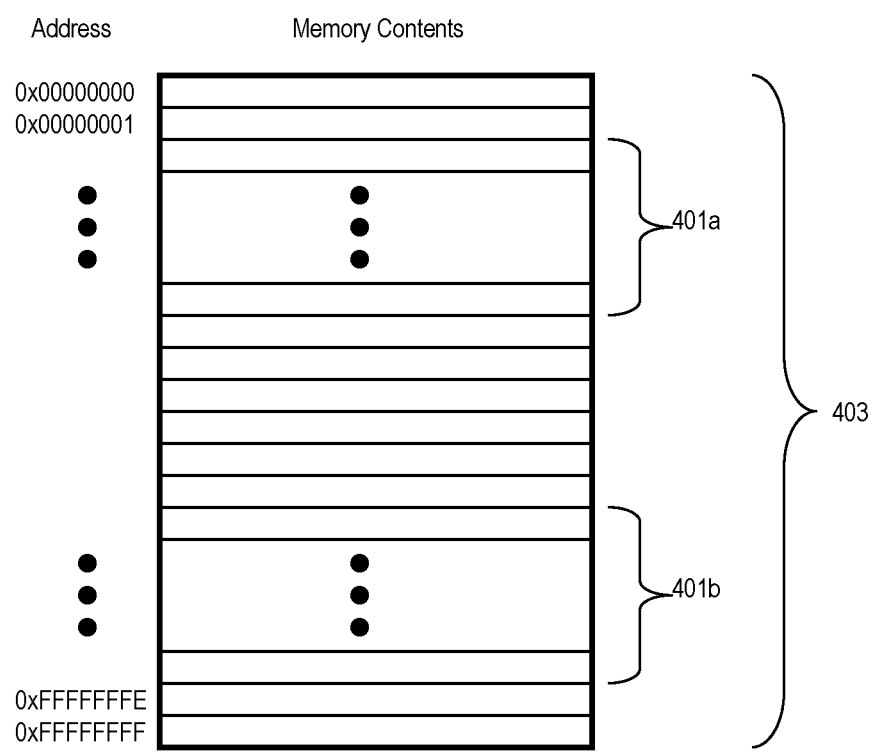
FIG. 4 illustrates a memory model in accordance with an embodiment of the present disclosure.

FIG. 4 illustrates a simplified flat physical address space model. The total amount of physical memory may differ from the amount depicted in FIG. 4. Embodiments in accordance with the present disclosure are able to create a fast clone of an entire address space 403 using processes described herein. Other embodiments are able to make fast clones of one or more portions 401a, 401b of the simplified flat physical address space model using processes described herein.

Figure 5A:
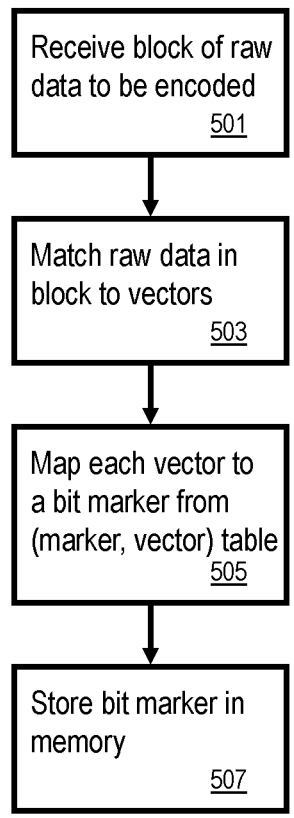
FIG. 5A illustrates a method to encode data in accordance with an embodiment of the present disclosure.

FIG. 5A illustrates an encoding process 500 in accordance with an embodiment of the present disclosure. Process 500 may be performed by operating system 204 and data adaptation module 211.

Process 500 begins at step 501, at which a block of raw data to be stored is received from an application program that intends to store the raw data. The raw data may be in the form of a file, a streaming media, a fixed-size or variable-size block of data, and so forth.

Next, process 500 transitions to step 503, at which portions of the raw data received in step 501 may be mapped or matched to candidate vectors of raw data. Matching the raw data to longer candidate vectors of raw data should produce greater data storage efficiency than matching the raw data to shorter candidate vectors of raw data. The candidate vectors may be stored as a table of (marker, vector) pairs in conventional memory. The goal is to represent each bit or byte in the raw data by at least one vector. Certain raw data bytes such as 0x00 or 0xFF may be deemed to be a default value, and for any raw data bytes equal to the default value, it is optional to represent bytes equal to the default value with a vector.

In step 503, a minimum threshold length limit may exist on the length of a portion of the raw data that will be mapped to candidate vectors of raw data. For example, raw data consisting of only a single byte would be too short to attempt to match to a candidate vector of raw data, because a pointer to the vector of raw data would be longer than the raw data itself. For raw data whose length exceeds the minimum threshold, if the raw data does not match an existing candidate vector of raw data, the raw data may be added as a new vector of raw data.

Next, process 500 transitions to step 505, at which vectors determined in step 503 may be mapped to a respective bit marker from the table of (marker, vector) pairs. The bit marker is a short way to refer to the associated vector.

Next, process 500 transitions to step 507, at which the bit marker from the table of (marker, vector) pairs is stored in memory, such as RAM storage unit 220.

Figure 5B:
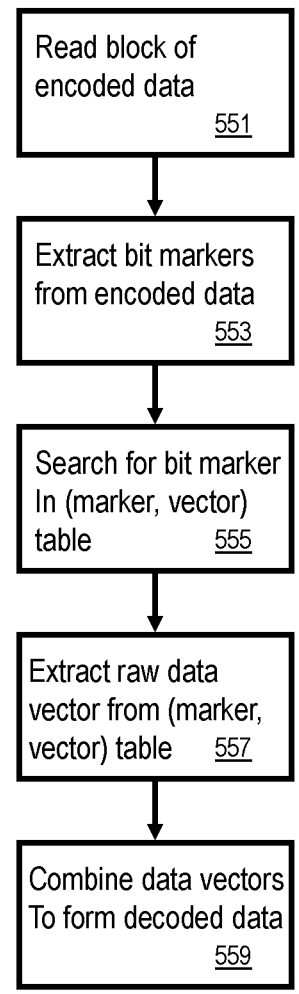
FIG. 5B illustrates a method to decode data in accordance with an embodiment of the present disclosure.

FIG. 5B illustrates a decoding process 550 in accordance with an embodiment of the present disclosure. Process 550 may be performed by operating system 204 and data adaptation module 211.

Process 550 begins at step 551, at which a block of encoded data to be decoded is read from a memory, such as RAM storage unit 220. Addresses may be managed by virtual address adjustment methods and tables, as known to persons of skill in the art.

Next, process 550 transitions to step 553, at which bit markers are extracted from the encoded data.

Next, process 550 transitions to step 555, at which the extracted bit markers from step 553 are searched for in the table of (marker, vector) pairs.

Next, process 550 transitions to step 557, at which a raw data vector is extracted from an entry in the table of (marker, vector) pairs, corresponding to the extracted bit marker from step 553.

Next, process 550 transitions to step 559, at which the extracted raw data vectors from step 557 are combined to form reconstructed decoded data. If the combined raw data vectors do not cover all addresses within an entire expected address range of the reconstructed decoded data, the uncovered addresses may be deemed to take on a default value in the decoded data, e.g., 0x00 or 0xFF bytes.

Figure 6A:
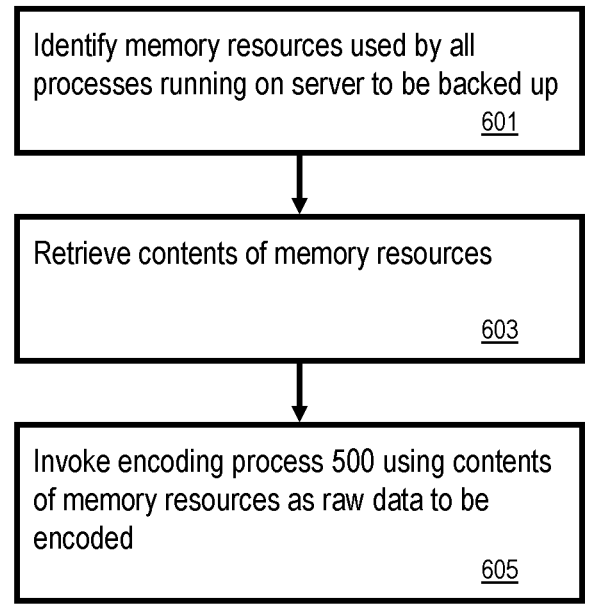
FIG. 6A illustrates a process to perform a blink backup of a source system, in accordance with an embodiment of the present disclosure.

FIG. 6A illustrates a process 600 to perform a blink backup of a source system, in accordance with an embodiment of the present disclosure. Process 600 may be performed by operating system 204 and data adaptation module 211.

Process 600 begins at step 601, at which memory resources to be backed up from the source system are identified. For example, the memory resources may correspond to an entire server, or a virtual server dedicated to a particular function or group. (e.g., accounting functions), or correspond to another similar computing system. More particularly, the memory resources may correspond to one or more processes executing on a source system (i.e., a system to be backed-up). A virtual server may be hosted on a physical server along with other virtual servers dedicated to other functions respectively such as sales and marketing, engineering department, etc.

Next, process 600 transitions to step 603, at which the memory contents identified in step 601 are retrieved from the source system (i.e., the system to be backed up). Control of process 600 may then transfer to encoding process 500 for further processing. The memory contents identified in step 601 may be used as the blocks of raw data input to be encoded by process 500. The blocks of raw data may be divided in substantially any convenient way prior to transfer to encoding process 500. For example, blocks of raw data may have substantially uniform block size (e.g., 1 Mbyte per block of raw data), or a block of raw data may correspond to a memory space used by a respective process of the server being backed up, and so forth. In some embodiments, a marker table as described in the '175 Application may be referenced by more than one blink backup.

Figure 6B:
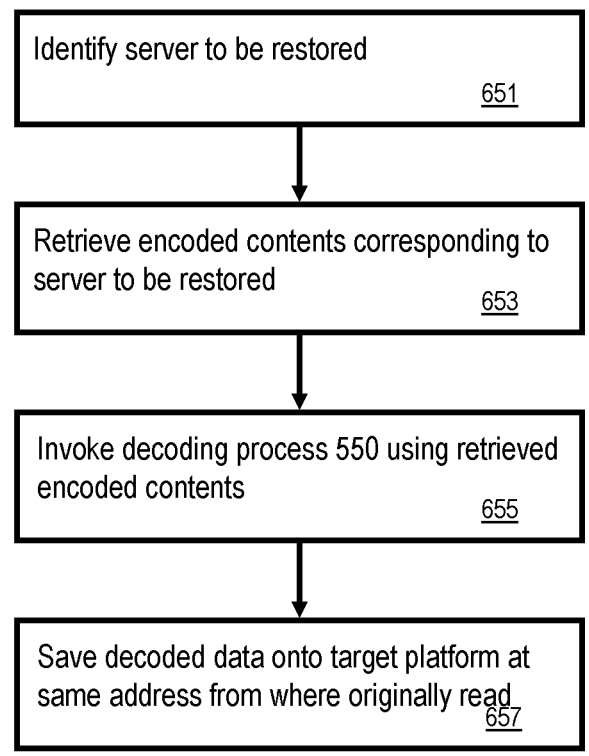
FIG. 6B illustrates a process to restore a system from a blink backup, in accordance with an embodiment of the present disclosure.

FIG. 6B illustrates a process 650 to restore a system from a blink backup, in accordance with an embodiment of the present disclosure. The blink backup may also be referred to as a target system, since it was the target of the backup when the blink backup was made. Process 650 may be performed by operating system 204 and data adaptation module 211.

Process 650 begins at step 651, at which embodiments identify a system to restore.

Next, process 650 transitions to step 653, at which encoded contents corresponding to the server to be restored are retrieved from an encoded memory such as NV-DIMM 309.

Next, process 650 transitions to step 655, at which a decoding process such as decoding process 550 is invoked in order to decode the retrieved encoded contents from step 653.

Next, process 650 transitions to step 657, at which the decoded data is saved into the memory space of a target system. The decoded data may be stored at the same memory addresses as it occupied on the source system.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶ 6, and any claim without the word "means" is not so intended.

We claim:

1. A specialized computer architecture system comprising:
   at least one random access memory;
   a secondary energy source connected to the at least one random access memory, the secondary energy source configured to supply power to the at least one random access memory during a power interruption in order to maintain data stored in the at least one random access memory during the power interruption; and
   a processor in electronic communication with the at least one random access memory through a communications bus to enable the processor to read and write data to the at least one random access memory;
   the processor configured to access raw uncoded data;
   the processor configured to generate encoded data based on encoding the raw uncoded data by using a bit-marker-based encoding process, wherein the bit-marker-based encoding process comprises decomposing the raw uncoded data into a plurality of data vectors and mapping each of the plurality of data vectors to a bit marker corresponding to a unique data vector;
   the processor configured to store the encoded data in the at least one random access memory, wherein the encoded data comprises a plurality of bit markers corresponding to unique data vectors in the plurality of data vectors decomposed from the raw uncoded data;
   the processor configured to process the raw uncoded data by accessing the encoded data stored in the at least one random access memory without the need for accessing a conventional persistent storage device;
   the processor configured to access the encoded data stored in the at least one random access memory during a power interruption based on power supplied by the secondary energy source to the processor and the at least one random access memory, wherein the encoded data stored in the at least one random access memory is lost during a power interruption without power supplied to the at least one random access memory form the secondary energy source;
   the processor configured to read the encoded data from the at least one random access memory;
   the processor configured to extract the plurality of bit markers from the encoded data;
   the processor configured to match each of the plurality of bit markers to a unique data vector stored in a bit-marker conversion table comprising bit-marker-data vector pairs; and
   the processor configured to combine the matched unique data vectors to form a block of raw uncoded data.

2. The specialized computer architecture system of claim 1, wherein the bit-marker-based encoding process further comprises storing a table of bit marker, unique data vector pairs.

3. The specialized computer architecture system of claim 2, wherein the table is stored in the at least one random access memory and is persevered during a power interruption by power from the secondary energy source.

4. The specialized computer architecture system of claim 1, wherein the secondary energy source comprises a large-capacitance capacitor.

5. The specialized computer architecture system of claim 1, wherein the secondary energy source comprises a battery.

6. The specialized computer architecture system of claim 1, wherein the at least one random access memory is configured to be a long-term electronic memory storage device.

7. The specialized computer architecture system of claim 1, wherein the at least one random access memory is configured to be a high-capacity and fast transfer rate digital storage device.

8. The specialized computer architecture system of claim 1, wherein the processor in electronic communication with the at least one random access memory transfer data through the communications bus at more than 57 gigabytes per second.

9. The specialized computer architecture system of claim 1, wherein the bit-marker based encoding process uses fractal patterns for data encoding and decoding.

10. The specialized computer architecture system of claim 1, wherein each of the plurality of bit markers can be reused to amplify an amount of raw uncoded data that can be stored in the at least one random access memory in an encoded form, wherein amplification is a ratio of a memory size of a bit marker to a memory size of raw data that corresponds to the bit marker multiplied by a number of instances of usage of the bit marker.

11. A specialized computer architecture system comprising:
    at least one random access memory;
    a secondary energy source connected to the at least one random access memory, the secondary energy source configured to supply power to the at least one random access memory during a power interruption in order to protect data stored on the at least one random access memory during the power interruption; and
    a processor in electronic communication with the at least one random access memory through a communications bus to enable the processor to read and write data to the at least one random access memory, the processor configured to process raw data by:
      encoding the raw uncoded data by using a bit-marker based encoding process, wherein the bit-marker-based encoding process comprises decomposing the raw uncoded data into a plurality of data vectors and mapping each of the plurality of data vectors to a bit marker corresponding to a unique data vector;
      storing the encoded data in the at least one random access memory without the need for a conventional persistent storage device, wherein the encoded data comprises a plurality of bit markers corresponding to unique data vectors in the plurality of data vectors decomposed from the raw uncoded data;
      preserving the encoded data stored in the at least one random access memory during a power interruption based on power supplied by the secondary energy source to the at least one random access memory, wherein the encoded data stored in the at least one random access memory is erased during a power interruption without power supplied to the at least one random access memory form the secondary energy source;
      reading the encoded data from the at least one random access memory;

extracting the plurality of bit markers from the encoded data;

matching each of the plurality of bit markers to a unique data vector stored in a bit-marker conversion table comprising bit-marker-data vector pairs; and combining the matched unique data vectors to form a block of raw uncoded data.

12. The specialized computer architecture system of claim 11, wherein the bit-marker-based encoding process further comprises storing a table of bit marker, unique data vector pairs.

13. The specialized computer architecture system of claim 12, wherein the table is stored in the at least one random access memory and is persevered during a power interruption by power from the secondary energy source.

14. The specialized computer architecture system of claim 11, wherein the secondary energy source comprises a large-capacitance capacitor.

15. The specialized computer architecture system of claim 11, wherein the secondary energy source comprises a battery.

16. The specialized computer architecture system of claim 11, wherein the at least one random access memory is configured to be a long-term electronic memory storage device.

17. The specialized computer architecture system of claim 11, wherein the at least one random access memory is configured to be a high-capacity and fast transfer rate digital storage device.

18. The specialized computer architecture system of claim 11, wherein the processor in electronic communication with the at least one random access memory transfer data through the communications bus at more than 57 gigabytes per second.

19. The specialized computer architecture system of claim 11, wherein the bit-marker based encoding process uses fractal patterns for data encoding and decoding.

20. The specialized computer architecture system of claim 11, wherein each of the plurality of bit markers can be reused to amplify an amount of raw uncoded data that can be stored in the at least one random access memory in an encoded form, wherein amplification is a ratio of a memory size of a bit marker to a memory size of raw data that corresponds to the bit marker multiplied by a number of instances of usage of the bit marker.

* * * * *